US011364998B2

United States Patent
Yoon et al.

(10) Patent No.: US 11,364,998 B2
(45) Date of Patent: Jun. 21, 2022

(54) PROPULSION SYSTEM COMPRISING SEPARABLE PROPELLER AND UNMANNED AERIAL VEHICLE COMPRISING SAME

(71) Applicant: Samsung Electronics Co., Ltd., Gyeonggi-do (KR)

(72) Inventors: Yeonggyu Yoon, Gyeonggi-do (KR); Seung-Chul Baek, Gyeonggi-do (KR); Min-Woo Yoo, Gyeonggi-do (KR); Min-Sung Lee, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 360 days.

(21) Appl. No.: 16/632,647

(22) PCT Filed: Jul. 25, 2018

(86) PCT No.: PCT/KR2018/008389
§ 371 (c)(1),
(2) Date: Jan. 21, 2020

(87) PCT Pub. No.: WO2019/027172
PCT Pub. Date: Feb. 7, 2019

(65) Prior Publication Data
US 2020/0164973 A1 May 28, 2020

(30) Foreign Application Priority Data

Aug. 3, 2017 (KR) .................. 10-2017-0098378

(51) Int. Cl.
*B64C 27/32* (2006.01)
*B64C 39/02* (2006.01)
*B64C 11/02* (2006.01)

(52) U.S. Cl.
CPC ............ *B64C 27/32* (2013.01); *B64C 39/024* (2013.01); *B64C 11/02* (2013.01);
(Continued)

(58) Field of Classification Search
CPC ... B64C 27/32; B64C 27/48; B64C 2201/042; B64C 2201/108; B64C 11/04; B64C 39/024; F01D 5/025
See application file for complete search history.

(56) References Cited

U.S. PATENT DOCUMENTS 9,359,070 B2   6/2016  Caubel
9,630,703 B2   4/2017  Wang et al.
(Continued)

FOREIGN PATENT DOCUMENTS

CN     105173072 A    12/2015
CN     106628165 A    5/2017
(Continued)

OTHER PUBLICATIONS

Korean Notice of Patent Grant dated Dec. 23, 2021.
(Continued)

*Primary Examiner* — Christopher D Hutchens
(74) *Attorney, Agent, or Firm* — Cha & Reiter, LLC

(57) ABSTRACT

An unmanned aerial comprises: a motor and a propeller assembly connected to the motor comprising: a first structure fixed to the motor, having a cylindrical wall defining an inner space, with a helical slit formed through the cylindrical wall; a second structure comprising a cylinder portion, a part of which is rotatably positioned in the inner space, and at least one protruding portion protruding from the outer surface of the cylinder portion to the outside of the cylindrical wall through the helical slit; and a propeller comprising a cylindrical hub engaging with the cylinder portion of the first structure, rotating blades extending from the cylindrical hub, and at least one rib extending from the cylindrical hub toward the motor, the propeller being configured such
(Continued)

that at least a part of the rib detachably engages with the first structure by the at least one protruding portion of the second structure.

20 Claims, 17 Drawing Sheets

(52) U.S. Cl.
CPC .. *B64C 2201/027* (2013.01); *B64C 2201/042* (2013.01); *B64C 2201/108* (2013.01)

(56) References Cited

U.S. PATENT DOCUMENTS

| | | | |
|---|---|---|---|
| 2014/0356174 A1 | 12/2014 | Wang et al. | |
| 2015/0129711 A1 | 5/2015 | Caubel | |
| 2017/0152035 A1 | 6/2017 | Zhao et al. | |
| 2017/0233062 A1* | 8/2017 | Li | A63H 27/02 416/209 |
| 2017/0240267 A1* | 8/2017 | Tao | F16D 1/112 |
| 2019/0193834 A1* | 6/2019 | Deng | B64C 11/04 |
| 2019/0248471 A1* | 8/2019 | Jiang | B64C 11/02 |
| 2019/0256204 A1* | 8/2019 | Sun | B64C 39/024 |
| 2019/0263501 A1* | 8/2019 | Wang | B64C 11/04 |
| 2019/0329877 A1* | 10/2019 | Benson | B64C 39/024 |
| 2021/0024204 A1* | 1/2021 | Chen | B64C 27/322 |

FOREIGN PATENT DOCUMENTS

| | | |
|---|---|---|
| KR | 10-1564380 B1 | 10/2015 |
| WO | 2016/074133 A1 | 5/2016 |
| WO | 2017/028503 A1 | 2/2017 |

OTHER PUBLICATIONS

Phantom 4 Pro+ Quick Start Guide.
Spiral and Helix. http://blog.naver.come/PostView.nhn?blogId=bjgim21&logNo=130184566688.
Korean Search Report dated Jul. 21, 2021.

* cited by examiner

PROPULSION SYSTEM COMPRISING SEPARABLE PROPELLER AND UNMANNED AERIAL VEHICLE COMPRISING SAME

CLAIM OF PRIORITY

This application is a National Phase Entry of PCT International Application No. PCT/KR2018/008389, which was filed on Jul. 25, 2018, and claims a priority to Korean Patent Application No. 10-2017-0098378, which was filed on Aug. 3, 2017, the contents of which are incorporated herein by reference.

TECHNICAL FIELD

Various embodiments of the disclosure relate to an unmanned aerial vehicle having a propulsion system including a separable propeller.

BACKGROUND ART

An unmanned aerial vehicle (or a drone) refers to an aerial vehicle that can automatically fly by being remotely controlled without a human on board. Compared to a normal aerial vehicle, the unmanned aerial vehicle does not have a boarding space for a human and thus can be miniaturized and lightened. Accordingly, unmanned aerial vehicles are developed and utilized for military purposes for collecting information of a place which is difficult for a user to access, and reconnoitering, like unmanned surveillance vehicles, but in recent years, are provided with an image capturing function and thus are commercialized and popularized for leisure.

DISCLOSURE OF INVENTION

Technical Problem

As unmanned aerial vehicles are popularized in recent years, an unmanned aerial vehicle including a separable propeller is developing for the purpose of enhancing portability. Related-art coupling between a propeller and an unmanned aerial vehicle may be established by an application of a bolt/nut, a spring, or self-tightening by rotation of screw threads and a motor. Such related-art coupling between the propeller and the unmanned aerial vehicle may cause unintended separation since an assembly thereof is difficult to achieve or complete fixing is not provided.

In addition, since the propeller is a rotor that rotates rapidly for the purpose of generating a lift force, the propeller may be vulnerable to a damage. Accordingly, the propeller may need to be replaced easily.

In addition, there may be a need for an unmanned aerial vehicle which can easily replace a propeller and can have the propeller completely fixed thereto to prevent untended separation in order to prevent a safety accident which may be caused by separation of the propeller from the unmanned aerial vehicle in flight, or a damage which may be caused by falling of the unmanned aerial vehicle.

Various embodiments of the disclosure provide a propulsion system including a separable propeller and an unmanned aerial vehicle including the same.

Various embodiments of the disclosure provide a propulsion system including a separable propeller, which is configured to be easily coupled and does not cause unintended separation, and an unmanned aerial vehicle including the same.

Solution to Problem

According to various embodiments of the disclosure, an unmanned aerial vehicle includes: a housing; a wireless communication circuitry positioned at least partially within or coupled to the housing, and configured to establish a wireless communication with an external controller; a plurality of propulsion systems embedded at least partially within or coupled to the housing; and a navigation circuitry configured to control the plurality of propulsion systems, wherein at least one of the plurality of propulsion systems includes: a motor controlled by the navigation circuitry; and a propeller assembly coupled to the motor, wherein the propeller assembly includes: a first structure including a cylindrical wall secured onto the motor to define an inner space, and a helical slit formed by penetrating through the cylindrical wall; a second structure including a cylinder part rotatably positioned at least partially in the inner space, and at least one protrusion protruding from an outer surface of the cylinder part to an outside of the cylindrical wall through the helical slit; and a propeller, wherein the propeller includes: a cylindrical hub engaging with the cylinder part of the second structure; a plurality of rotor blades extended from the cylindrical hub; and at least one rib extended from the cylindrical hub towards the motor, wherein at least part of the rib detachably engages with the first structure via the at least one protrusion of the second structure.

According to various embodiments of the disclosure, a propulsion system includes: a motor including a motor main body and a motor rotation part; a first structure including a cylindrical wall secured onto the motor to define an inner space, and including at least one helical slit formed by penetrating through the cylindrical wall, and at least one guide groove configured to allow a propeller to detachably engage therewith; a second structure including a cylinder part rotatably positioned at least partially in the inner space, and at least one protrusion protruding from an outer surface of the cylinder part to an outside of the cylindrical wall through the at least one helical slit; and an elastic member disposed within the inner space and configured to push up the cylinder part from the motor rotation part.

Advantageous Effects of Invention

According to various embodiments of the disclosure, the unmanned aerial vehicle can easily engage or disengage the propeller only by a single operation of a user simply pushing the propeller or a specific component, and simultaneously, the assembly structure of the propeller which is not easily separated by an external shock is provided.

BEST MODE FOR CARRYING OUT THE INVENTION

Figure 1:
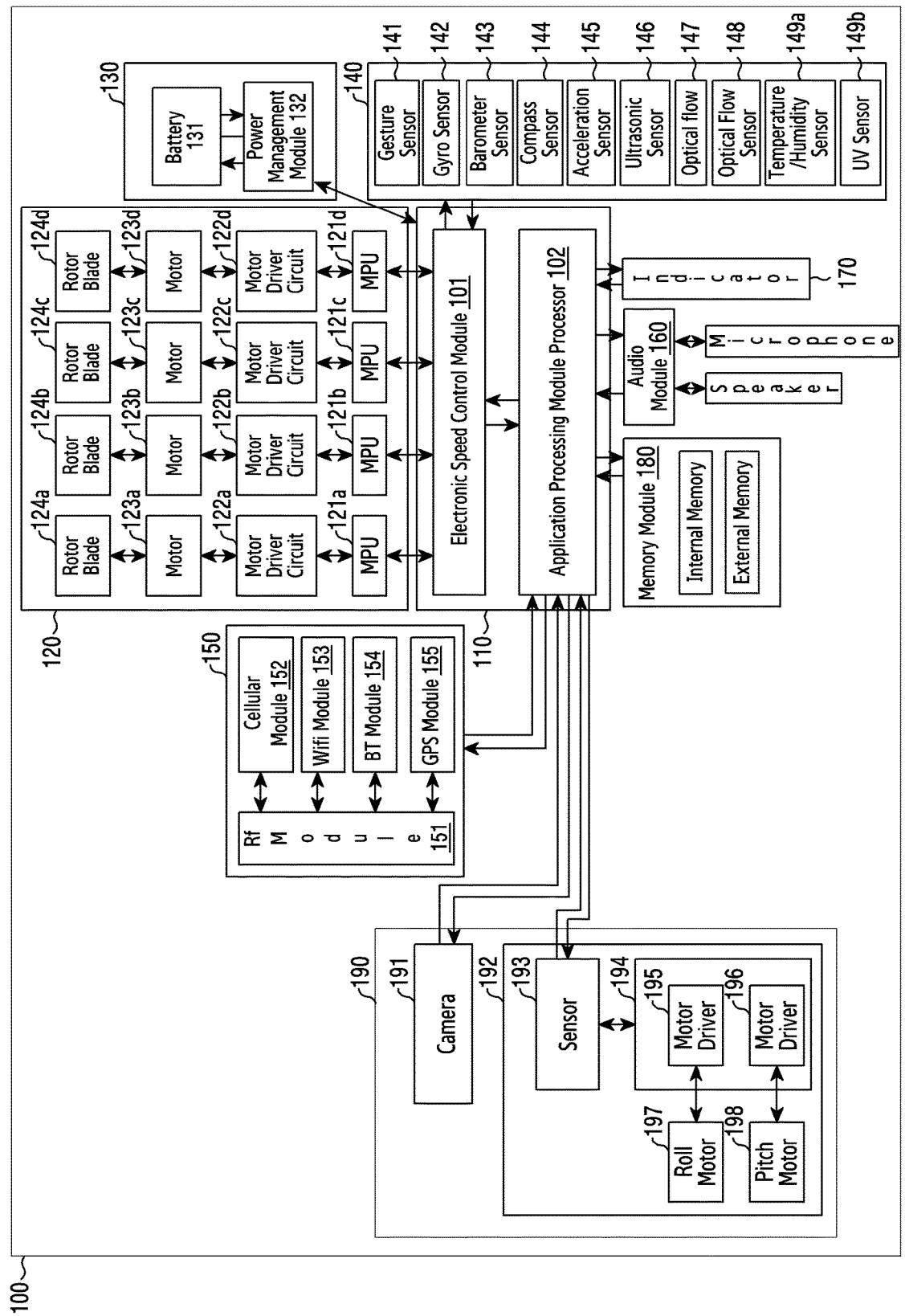
FIG. 1 is a block diagram of an unmanned aerial vehicle according to various embodiments of the disclosure.

The present invention may have various embodiments, and modifications and changes may be made therein. Therefore, the present invention will be described in detail with reference to particular embodiments shown in the accompanying drawings. However, it should be understood that there is no intent to limit various embodiments of the present invention to the particular embodiments disclosed herein, but the present invention should be construed to cover all modifications, equivalents, and/or alternatives falling within the spirit and scope of the various embodiments of the present invention. In describing the drawings, similar reference numerals are used to designate similar elements.

As used herein, the expression "have", "may have", "include", or "may include" refers to the existence of a corresponding feature (e.g., numeral, function, operation, or constituent element such as component), and does not exclude one or more additional features.

In the present disclosure, the expression "A or B", "at least one of A or/and B", or "one or more of A or/and B" may include all possible combinations of the items listed. For example, the expression "A or B", "at least one of A and B", or "at least one of A or B" refers to all of (1) including at least one A, (2) including at least one B, or (3) including both at least one A and at least one B.

The expression "a first", "a second", "the first", or "the second" used in various embodiments of the present disclosure may modify various components regardless of the order and/or the importance but does not limit the corresponding components. For example, a first user device and a second user device indicate different user devices although both of them are user devices. For example, a first element may be termed a second element, and similarly, a second element may be termed a first element without departing from the scope of the present disclosure.

It should be understood that when an element (e.g., first element) is referred to as being (operatively or communicatively) "connected," or "coupled," to another element (e.g., second element), it may be directly connected or coupled directly to the other element or any other element (e.g., third element) may be interposer between them. In contrast, it may be understood that when an element (e.g., first element) is referred to as being "directly connected," or "directly coupled" to another element (second element), there are no element (e.g., third element) interposed between them.

The expression "configured to" used in the present disclosure may be exchanged with, for example, "suitable for", "having the capacity to", "designed to", "adapted to", "made to", or "capable of" according to the situation. The term "configured to" may not necessarily imply "specifically designed to" in hardware. Alternatively, in some situations, the expression "device configured to" may mean that the device, together with other devices or components, "is able to". For example, the phrase "processor adapted (or configured) to perform A, B, and C" may mean a dedicated processor (e.g. embedded processor) only for performing the corresponding operations or a generic-purpose processor (e.g., central processing unit (CPU) or application processor (AP)) that can perform the corresponding operations by executing one or more software programs stored in a memory device.

The terms used herein are merely for the purpose of describing particular embodiments and are not intended to limit the scope of other embodiments. As used herein, singular forms may include plural forms as well unless the context clearly indicates otherwise. Unless defined otherwise, all terms used herein, including technical and scientific terms, have the same meaning as those commonly understood by a person skilled in the art to which the present disclosure pertains. Such terms as those defined in a generally used dictionary may be interpreted to have the meanings equal to the contextual meanings in the relevant field of art, and are not to be interpreted to have ideal or excessively formal meanings unless clearly defined in the present disclosure. In some cases, even the term defined in the present disclosure should not be interpreted to exclude embodiments of the present disclosure.

Hereinafter, various embodiments will be described in detail with reference to the accompanying drawings. However, in the drawings, the components may be exaggerated or reduced in size for convenience of description. For example, the size and thickness of each component shown in the drawings are arbitrarily shown for convenience of description, and thus the present disclosure is not necessarily limited to the illustrated.

FIG. 1 is a block diagram of an unmanned aerial vehicle according to various embodiments of the disclosure. FIG. 1 illustrates the unmanned aerial vehicle as an example of a quad-rotor (or quad-copter). Referring to FIG. 1, the unmanned aerial vehicle 100 may include a processor 110, a movement module 120, a battery module 130, a sensor module 140, a communication module 150, an audio module 160, an indicator 170, a memory module 180, and/or a camera module 190.

The processor 110 may include the processor 110 or one or more processors including an electronic speed control (ESC) (or movement control) module 101 and an application processing module 102. The processor 110 may execute a control of at least one other components of the unmanned aerial vehicle 110, and/or an operation or data processing related to communication.

The ESC module 111 may control a movement of the unmanned aerial vehicle 100 by using position and posture information of the unmanned aerial vehicle 100 or an operation signal of a controller. Alternatively, the ESC module 111 may include a flight control module and a posture control module. The flight control module may control roll, pitch, yaw, throttle, or the like of the unmanned aerial vehicle 100, based on position and posture information obtained by the posture control module, and an operation signal of the controller. The ESC module 111 may control a hovering operation, and may fly the unmanned aerial vehicle 100 to a target point, based on position information provided by the application processing module 112 and an operation signal of the controller.

The application processing module 112 may receive state information of the unmanned aerial vehicle 100 and may provide the state information to the controller. Alternatively, the state information of the unmanned aerial vehicle 100 may be notified to a user by controlling the audio module 160 or a display. Alternatively, when a camera device is mounted, an automatic capturing mode may be controlled based on received capturing information. The capturing information may include capturing location information. The capturing information may include composition information and/or camera control information, in addition to the capturing location information. The capturing information may be capturing information based on a user preference in the electronic device. The application processing module 112 may deliver the capturing location information to the ESC module 111, and may control the movement of the unmanned aerial vehicle 100. The application processing module 112 may deliver driving and/or camera control information to the camera device to control a composition for capturing and an angle between the camera and a subject.

When the unmanned aerial vehicle 100 is a quad rotor, the movement module 120 (or a propulsion system) may include a corresponding number of microprocessor units (MPUs) 121a-121d, a corresponding number of motor driver circuits 122a-122d, a corresponding number of motors 123a-123d, and a corresponding number of rotor blades 124a-124d. The MPUs 121a-121d may output control data to rotate the corresponding rotor blades 124a-124d based on an operation signal outputted from the ESC module 111. The motor driver circuits 122a-122d may convert the motor control data outputted from the MPUs 121a-121d into driving signals, and may output the driving signals. The motors 123a-123d may control rotations of the corresponding rotor blades 124a-124d, based on the driving signals of the motor driver circuits 122a-122d.

The battery module 130 may include a battery 131 and a power management module 132. The power management module 132 may supply power to the unmanned aerial vehicle 100, and may manage supplied power. According to various embodiments, the power management module 132 may include a power management integrated circuit (PMIC), a charger IC, or a battery gauge. The PMIC may have a wired charging method and/or a wireless charging method. The wireless charging method may include, for example, a magnetic resonance method, a magnetic induction method or an electromagnetic wave method. The PMIC may further include an additional circuit for wirelessly charging, for example, a coil loop, a resonance circuit, or a rectifier, and the like. The battery gauge may measure, for example, a remaining capacity of the battery and a voltage, current or temperature thereof while the battery is charged. The battery 131 may include, for example, a rechargeable battery and/or a solar battery.

According to various embodiments, the battery module 130 may be electrically/physically connected to the processor 110 to supply power. For example, the battery module 130 may be electrically/physically connected with the ESC module 111 of the processor 110.

The sensor module 140 may include some or all of a gesture sensor 141 to detect a motion and/or a gesture of a subject, a gyro sensor 142 to measure an angular speed of the flying unmanned aerial vehicle 100, a barometer 143 to measure a change in atmospheric pressure and/or atmospheric pressure, a terrestrial magnetism sensor (compass sensor) 144 to measure Earth's magnetic field, an acceleration sensor 145 to measure an acceleration of the flying unmanned aerial vehicle 100, an ultrasonic sensor 146 to measure a distance by outputting ultrasonic waves and measuring a signal reflected from an object, an optical flow 147 to calculate a location by recognizing geographical features or a pattern of a bottom by using the camera module, a temperature/humidity sensor 149a to measure temperature and humidity, an illuminance sensor 148 to measure illuminance, and an ultra violet (UV) sensor 149b to measure ultraviolet rays.

According to various embodiments of the disclosure, the sensor module 140 may measure a distance between the unmanned aerial vehicle 100 and the ground. A sensor to measure the distance between the unmanned aerial vehicle 100 and the ground may be the ultrasonic sensor 146 or the optical flow 147. The ultrasonic sensor 146 may measure the distance to the ground by outputting ultrasonic waves and measuring ultrasonic waves reflected from the ground. The optical flow 147 may measure the distance of the unmanned aerial vehicle 100 from the ground by recognizing geographic features or a pattern of the bottom by using an image capturing device such as a camera.

According to various embodiments of the disclosure, the communication module 150 may include at least one of a wireless communication module and a wired communication module. The communication module 150 may include a radio frequency (RF) module 151, a cellular module 152, a WiFi module 153, a Bluetooth module 154, and a global positioning system (GPS) module 155.

According to various embodiments of the disclosure, the GPS module 155 may output location information of the unmanned aerial vehicle 100, such as longitude, latitude, altitude, GPS speed, GPS heading, while the unmanned aerial vehicle 100 is flying. The location information may be obtained by measuring an exact time and a distance through the GPS module. The GPS module 155 may obtain an exact time along with three-dimensional speed information, in addition to the latitude, the longitude, the altitude.

The communication module 150 may communicate with another electronic device (for example, a controller) to receive a movement operation signal of the unmanned aerial vehicle 100, or to transmit information for identifying a movement state in real time. According to various embodiments, the communication module 150 may transmit an image captured in the unmanned aerial vehicle 100 and capturing information to an external electronic device such as a controller.

The audio module 160 may convert a sound and an electric signal in dual directions, for example. The audio module 160 may process sound information which is inputted or outputted through a speaker, a receiver, an earphone, or a microphone, for example.

The indicator 170 may display a specific state of the unmanned aerial vehicle 100 or a part thereof (for example, the processor 110), such as a booting state, a message state, a charging state, and the like.

The memory module 180 may include an internal memory and an external memory. The memory module 180 may store a command or data related to at least one other component of the unmanned aerial vehicle 100. The memory module 180 may store software and/or a program. The program may include a kernel, middleware, an application programming interface (API) and/or an application program (or "application").

The camera module 190 (or an image capturing device) may include a camera 191 and/or a gimbal 192. The gimbal 192 may include a gimbal controller 194, a gyro/acceleration sensor 193, a motor driver circuit 195, 196, and/or a roll motor 197, pitch motor 198.

The camera module 190 may include a lens, an image sensor, an image signal processor, a camera controller, which are not illustrated. The lens may perform a function of focusing by using properties of straight and refraction of light, and a function of zooming in/out a subject. The image sensor may have a structure of a complementary metal-oxide semiconductor (CMOS) or a charge coupled device (CCD) (CMOS image sensor, a CIS, or a CCD).

The image signal processor may include an image pre-processing unit to perform auto white balance (AWB), auto exposure (AE), auto focusing (AF) extraction and processing, lens shading correction with respect to images of each sub frame, and an image post-processing unit to perform color interpolation, image processing chain (IPC), color convert, or the like. Alternatively, the image processor signal processor may include an encoder to encode processed images, and a decoder to decode an encoded image.

The camera controller may adjust a composition and/or a camera angle (capturing angle) with a subject by adjusting an angle of the lens vertically and horizontally, based on composition information and/or camera control information outputted from the processor 110.

The gimbal 192 may control a slope of the camera 191, such that the camera 191 maintains its posture regardless of a movement of the unmanned aerial vehicle 100. The gimbal 192 may include a sensor 193 to control the slope, a gimbal controller 194, and a motor driver circuit 195. 196.

However, embodiments are not limited thereto, and the configurations of the unmanned aerial vehicle may be applied to all kinds of unmanned aerial vehicles including at least one propeller.

Figure 2A:
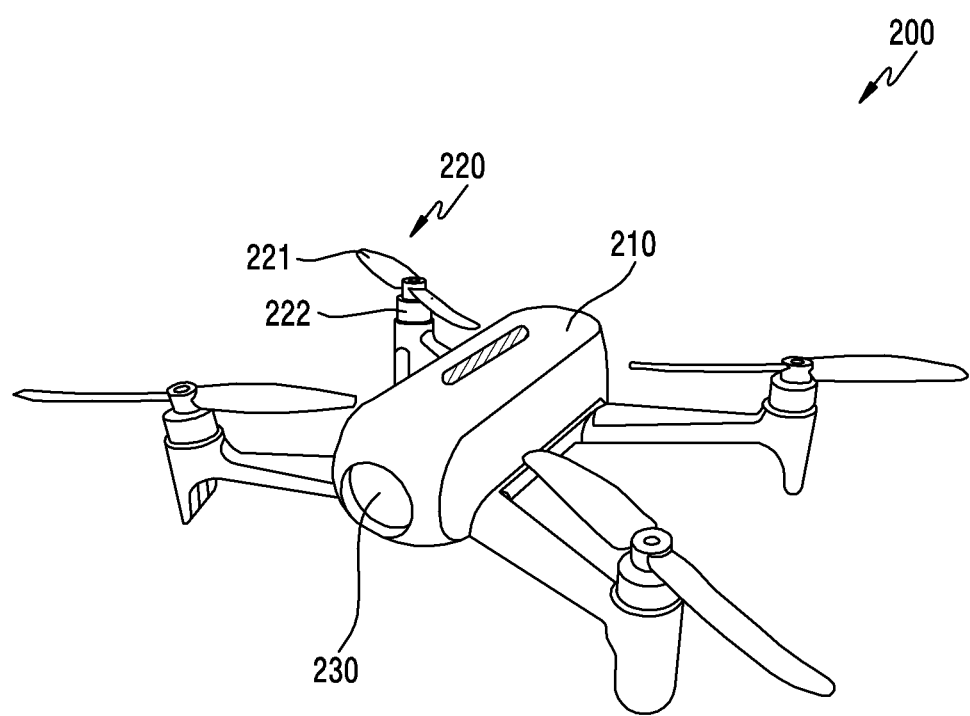
FIG. 2A is a perspective view of an unmanned aerial vehicle according to various embodiments of the disclosure.

FIG. 2A is a perspective view of an unmanned aerial vehicle according to various embodiments of the disclosure. The unmanned aerial vehicle 200 of FIG. 2A may be similar to the unmanned aerial vehicle 100 explained in FIG. 1 at least partially, or may include other embodiments of the unmanned aerial vehicle.

Referring to FIG. 2A, the unmanned aerial vehicle 200 according to various embodiments of the disclosure may include a housing 210 and a plurality of propulsion systems 220. According to an embodiment, the plurality of propulsion systems 220 may cause the unmanned aerial vehicle 200 to fly by providing a lift force to the unmanned aerial vehicle 200. Each of the plurality of propulsion systems 220 may include a propeller 221 and a motor 222 to rotate the propeller 221. The propeller 221 may change the rotation of the motor 222 into a lift force. In other words, the unmanned aerial vehicle 200 may fly by using the lift forces of the plurality of propellers 221. The propulsion system 200 may be referred to as a flight driver or a propeller assembly.

According to various embodiments, the housing 210 may include a communication unit (or a wireless communication circuitry) (for example, the communication module 150 of FIG. 1) coupled to the housing 210 or positioned within the housing 210, a controller (or a navigation circuitry) (for example, the processor 110 of FIG. 1), a sensor unit (for example, the sensor module 140 of FIG. 1), or an image capturing device 230 (for example, the camera module 190 of FIG. 1).

According to an embodiment, the communication unit may wirelessly communicate with an external controller (or a remote controller) to control the unmanned aerial vehicle 200. The communication unit may receive a control signal of the external controller to control the unmanned aerial vehicle 200. Alternatively, the communication unit may transmit information regarding a flight state of the unmanned aerial vehicle 200 to the remote controller.

According to an embodiment, the controller may drive the propulsion system 220 according to a control signal received from the remote controller to control a movement of the unmanned aerial vehicle 200.

According to an embodiment, the sensor unit may include a gyro sensor to measure an angular speed of the flying unmanned aerial vehicle 200, a barometer to measure a change in atmospheric pressure and/or atmospheric pressure, a terrestrial magnetism sensor (compass sensor) to measure Earth's magnetic field, an acceleration sensor to measure an acceleration of the flying unmanned aerial vehicle, a proximity sensor to measure a proximity state of an object, a distance (including an ultrasonic sensor to measure a distance by outputting ultrasonic waves and measuring a signal reflected from an object), an optical sensor (OFS, an optical flow, or the like) to calculate a location by recognizing geographical features or a pattern of a bottom, or the like. The sensor unit may obtain environmental information for controlling a posture of the unmanned aerial vehicle 200.

According to an embodiment, the image capturing device 230 may be mounted outside the housing 210 or may be positioned inside the housing 210. The image capturing device 230 may be implemented in various forms to capture a still image or to make a video.

Figure 2B:
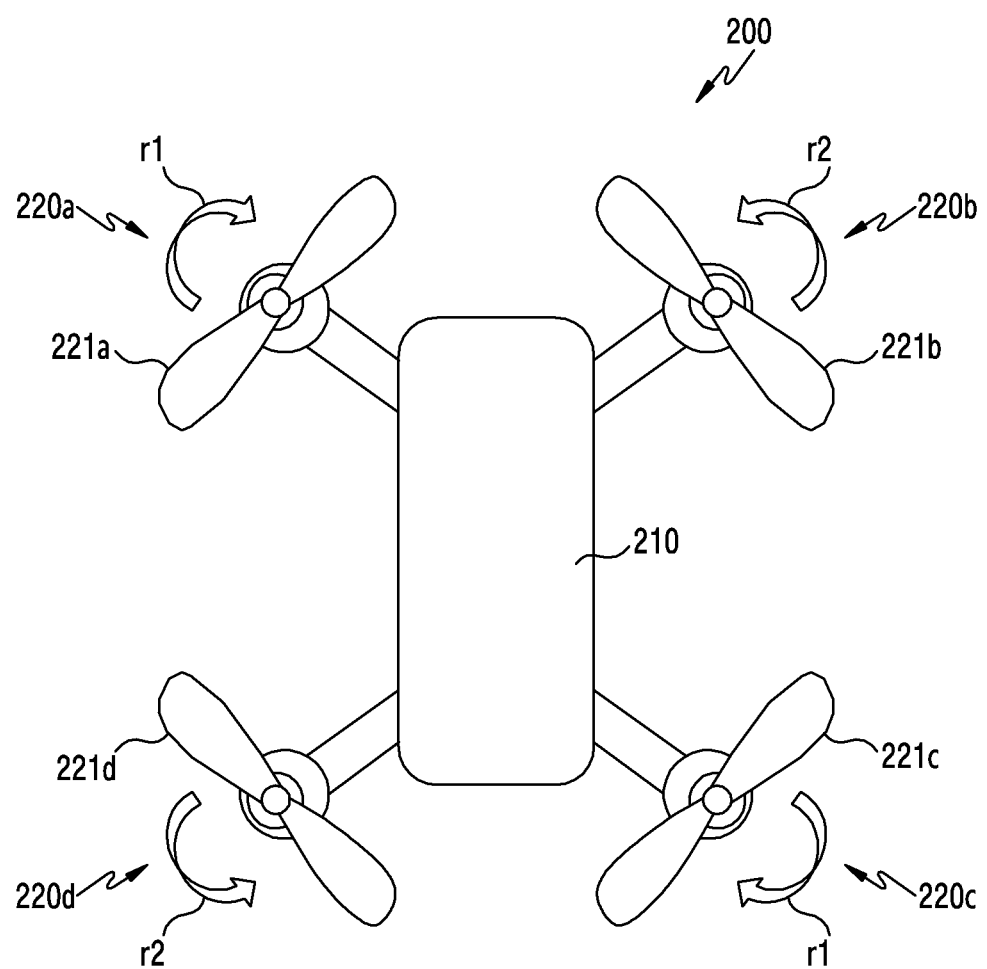
FIG. 2B is a top view of the unmanned aerial vehicle according to various embodiments of the disclosure.

FIG. 2B is a top view of the unmanned aerial vehicle according to various embodiments of the disclosure. Referring to FIG. 2B, the unmanned aerial vehicle 200 according to various embodiments of the disclosure is a quad rotor, and may include four propulsion systems 220a to 220d which are extended from the housing 210 or are installed on the housing 210. The propulsion systems 220a-220d may be arranged symmetrically in a diagonal direction with the housing 210 being disposed therebetween. For example, the first propulsion system 220a may be disposed to neighbor the second propulsion system 220b and the fourth propulsion system 220d with reference to the housing 210, and to face the third propulsion system 220c. In other words, the second propulsion system 220b may be disposed to neighbor the first propulsion system 220a and the third propulsion system 220c with reference to the housing 210, and to face the fourth propulsion system 220d.

According to an embodiment, the unmanned aerial vehicle 200 may rotate the propellers of the opposite propulsion systems in the same direction, and rotate the neighboring propellers in the opposite directions. For example, the unmanned aerial vehicle 200 may control the first propeller 221a and the third propeller 221c to rotate in a first rotation direction r1 which is the clockwise direction, and the second propeller 221b and the fourth propeller 221d to rotate in a second direction r2 which is the counter clockwise direction. In another example, the unmanned aerial vehicle 200 may control the first propeller 221a and the third propeller 221c to rotate in the second rotation direction R2, and the second propeller 221b and the fourth propeller 221d to rotate in the first rotation direction r1. The reason why the propellers are rotated in different directions as described above is to preserve momentum thereof. If the four propellers are rotated in the same direction, the flight of the unmanned aerial vehicle 200 may not be stable and may deviate. That is, the unmanned aerial vehicle 200 may stably fly while preventing abnormal movements by using the propellers having the different rotation directions. Accordingly, the propellers 221a-221d included in the propulsion systems 220 may be configured to have different rotation directions. Alternatively, motors for driving the propellers 221a-221d may be configured to have different rotation directions.

The unmanned aerial vehicle 200 according to various embodiments of the present disclosure may include a twin-rotor having two propellers (or propulsion systems), a tri-rotor having three propellers, a quad rotor having four propellers, a penta-rotor having five propellers, a hexa-rotor having six propellers, an octo-rotor having eight propellers, or a coaxial unmanned aerial vehicle having two propellers which rotate about the same axis in the opposite directions. The unmanned aerial vehicle 200 according to various embodiments of the disclosure will be described as a quad rotor for convenience of explanation, but is not limited thereto. The number of propulsion systems or the number of propellers, and their respective configurations and rotation directions may vary.

Figure 3A:
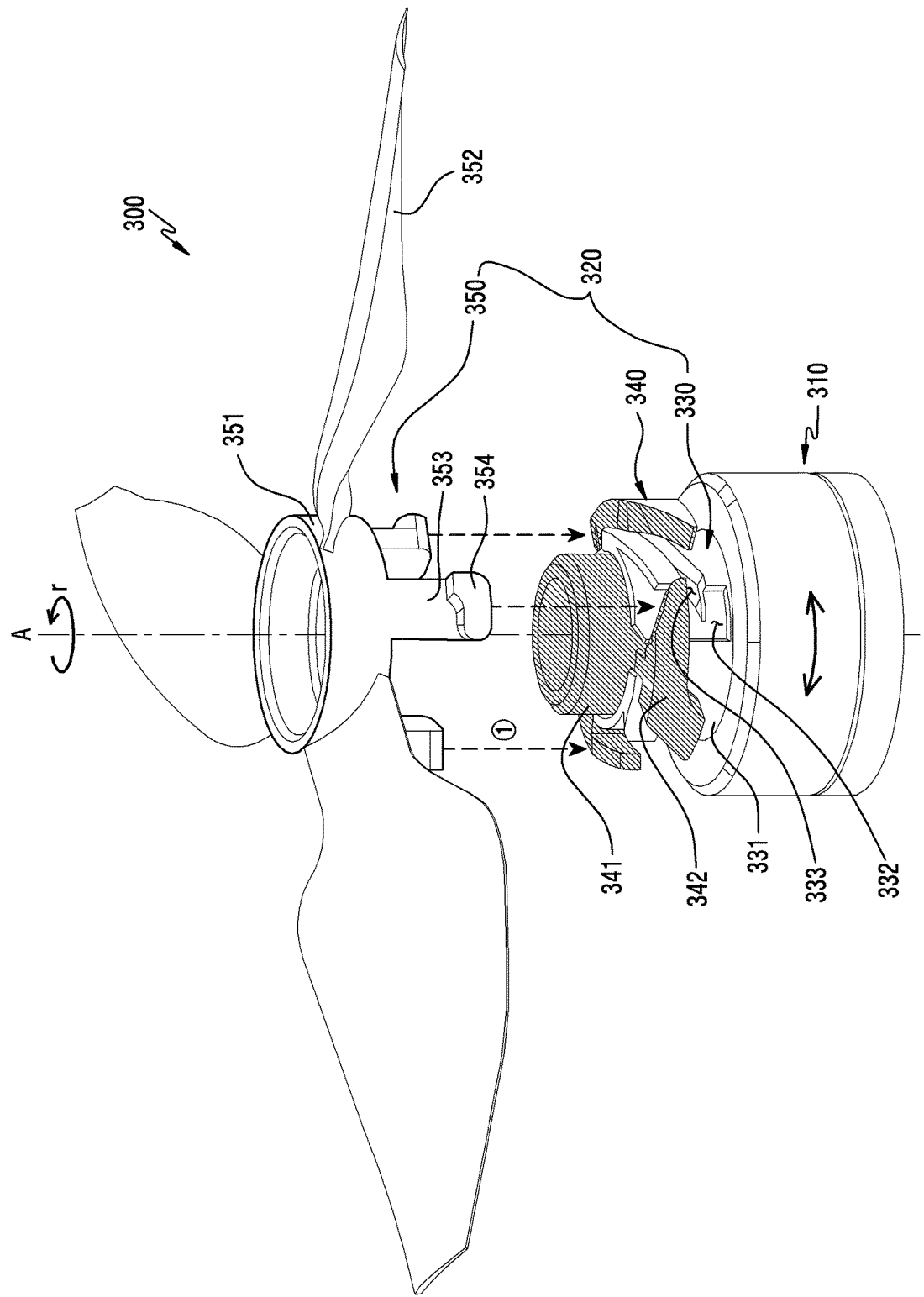
FIG. 3A is a perspective view of a propulsion system from which a propeller is separated according to various embodiments of the disclosure.
Figure 3B:
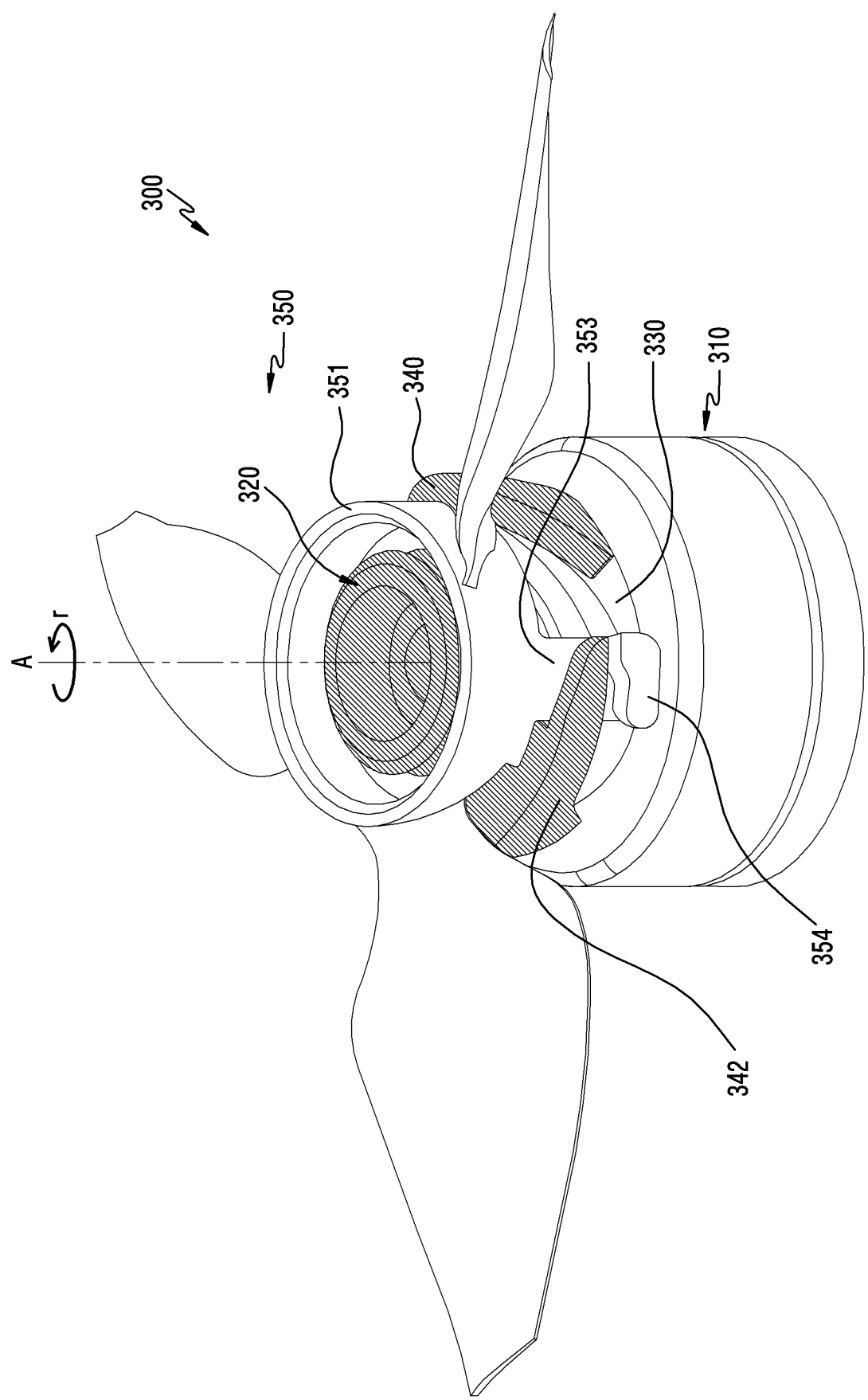
FIG. 3B is a perspective view of the propulsion system with which the propeller engages according to various embodiments of the disclosure.

FIG. 3A is a perspective view of a propulsion system from which a propeller is separated according to various embodiments of the disclosure. FIG. 3B is a perspective view of the propulsion system with which the propeller engages. The propulsion system 300 of FIGS. 3A and 3B may be similar to the propulsion system 220 described in FIG. 2A at least partially, or may include other embodiments of the propulsion system.

Referring to FIGS. 3A and 3B, the propulsion system 300 according to various embodiments of the disclosure may include a motor 310 and a propeller assembly 320 which includes a first structure 330, a second structure 340, and a propeller 350.

According to an embodiment, the motor 310 may be configured to rotate the propeller assembly 320. The first structure 330 may be fixed to the motor 310 to receive a rotation of the motor 310. For example, the first structure 330 may be fixedly coupled with the motor 310, or may be integrated with the motor 310. The first structure 330 may have a cylindrical wall shape. The first structure 330 may include at least one guide groove 332 and at least one helical slit 333 which are formed on the cylindrical wall 331. The guide groove 332 may be engaged with the propeller 350, and the helical slit 333 may be engaged with the second structure 340. According to an embodiment, the second structure 340 may include a cylinder part 341 positioned in an inner space defined by the cylindrical wall 331 of the first structure 330 to be rotatable partially. The second structure 340 may include a protrusion 342 which protrudes from an external surface of the cylinder part 341 to the outside of the cylindrical wall 331 through the helical slit 333 of the first structure 330.

According to an embodiment, the propeller 350 may include a cylindrical hub 351, a plurality of rotor blades extended along a circumferential surface of the cylindrical hub 351 to have the same central angle, and at least one rib 353 extended from the cylindrical hub 351 toward the motor 310 along a rotation axis A. The at least one rib 353 may include a latch 354 which protrudes therefrom at least partially in a radial direction of the cylindrical hub 351. Referring to FIG. 3A, the propeller 350 may be configured to be separated from the propeller assembly 320. A user may engage the propeller 350 with the propeller assembly 320 by inserting the at least one rib 353 of the separated propeller 350 into the guide groove 332 of the first structure 330.

Referring to FIG. 3B, the propeller 350 according to various embodiments may be engaged with the propeller assembly 350. The at least one rib 353 (FIG. 3A) is inserted into the guide groove 332 (FIG. 3A) of the first structure 330, such that the propeller 350 in engagement with the propeller assembly 320 is fixed not to be separated in the rotation direction r. The protrusion 342 of the second structure 340 may be positioned to overlap an upper portion of the latch 354 and a portion of the rib 353 and to confine an upward movement of the latch 354 of the rib 353. Accordingly, the propeller 350 may not be separated from the propeller assembly 320 in the upward direction along the rotation axis A. In another embodiment, the protrusion 342 may helically move along the helical slit 333 and may be positioned not to overlap the rib 353 (or the guide groove 332 into which the rib 353 is inserted). In this case, the propeller 350 may be separated from the propeller assembly 320. A helical movement mechanism allowing the protrusion 342 to overlap the rib 353 or not to overlap the rib 353 will be described in detail below.

As described above, the propeller 350 of the propulsion system 300 according to various embodiments may be detachably engaged with the first structure 330 by the second structure 340. Accordingly, the user can easily replace the propeller 350 and can easily carry the unmanned aerial vehicle including the propulsion system 300.

Figure 4A:
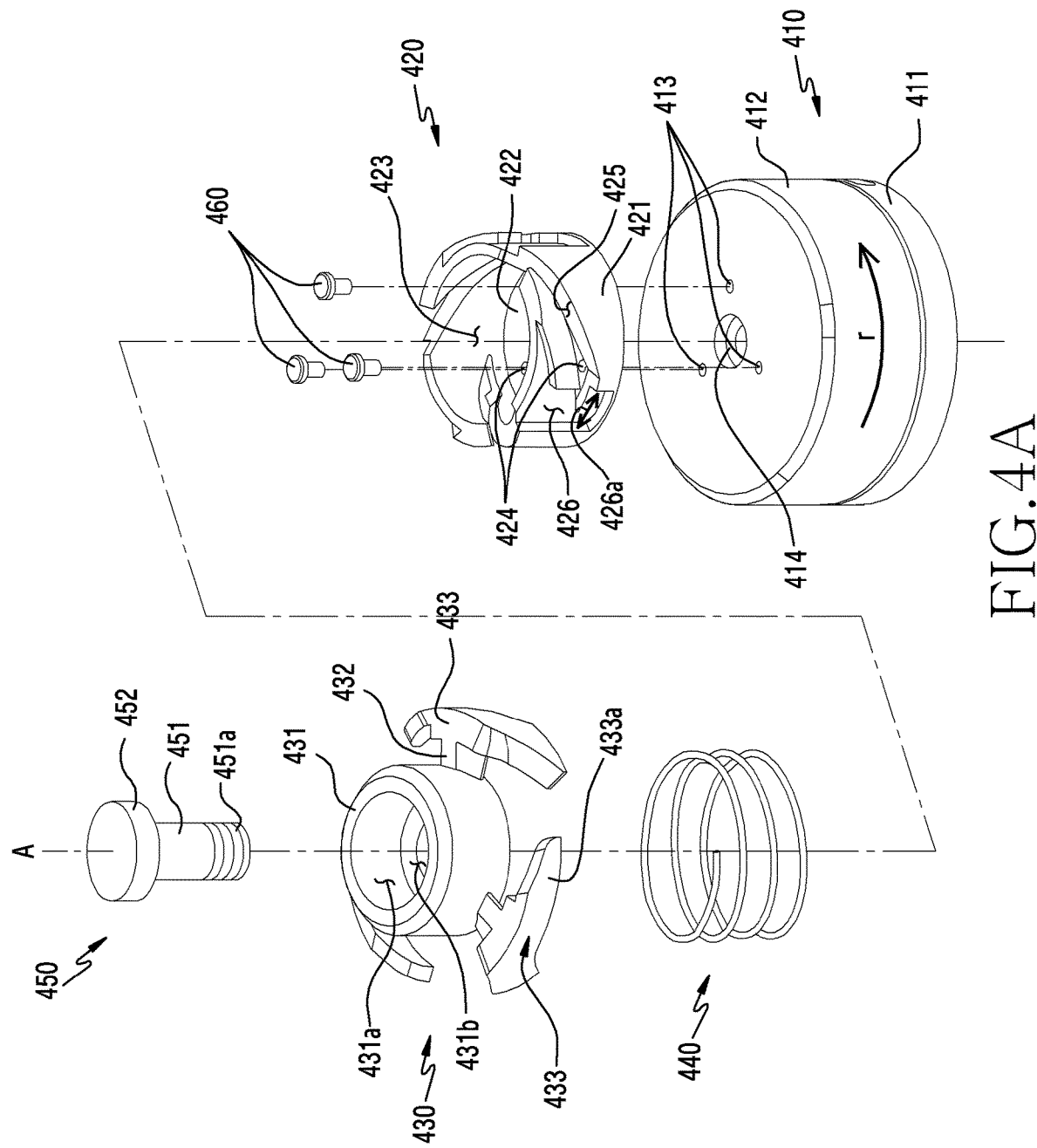
FIG. 4A is an exploded perspective view of a propulsion system according to various embodiments of the disclosure.
Figure 4B:
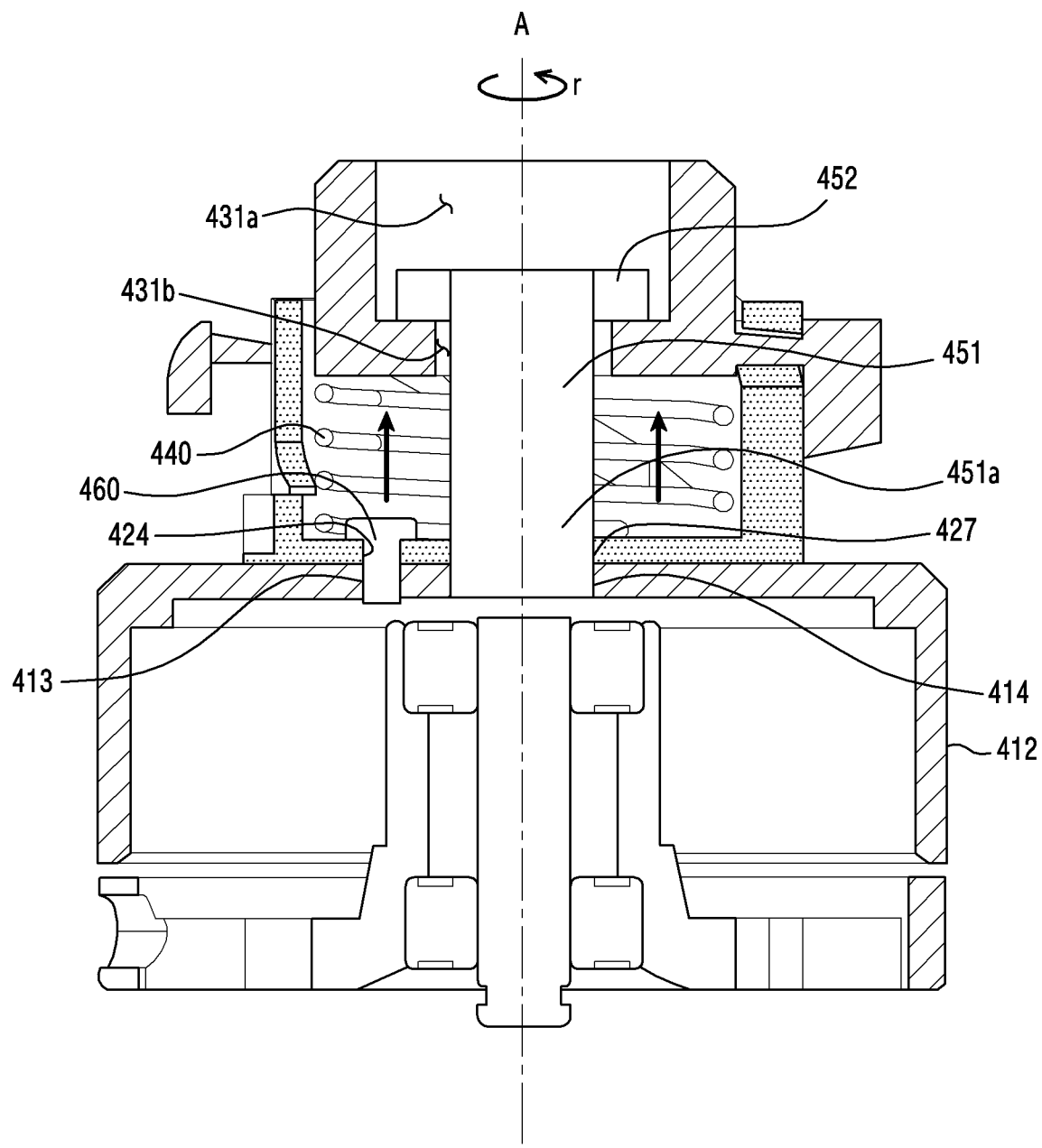
FIG. 4B is a cross-sectional view of the propulsion system according to various embodiments of the disclosure.

FIG. 4A is an exploded perspective view of a propulsion system according to various embodiments of the disclosure. FIG. 4B is a cross-sectional view of the propulsion system according to various embodiments of the disclosure. FIGS. 4A and 4B illustrate components constituting the propulsion system 400 according to various embodiments, and illustrate an assembly structure of the components. The propulsion system 400 illustrated in FIGS. 4A and 4B may be similar to the propeller assembly included in the propulsion system 300 explained in FIGS. 3A and 3B at least partially, or may include other embodiments of the propeller assembly.

According to various embodiments, the propulsion system 400 may include, as components, a motor 410 and a propeller assembly which includes a first structure 420, a second structure 430, an elastic member 440, a fixing member 450, and a propeller (for example, 350 of FIG. 3A). Hereinafter, the components of the propulsion assembly 400 will be described according to the order of normal assembly.

According to various embodiments, the motor 410 may be configured to provide a rotation to the propeller to generate a lift force. According to an embodiment, the motor 410 may include a motor main body 411 and a motor rotation part 412. The motor 410 may be configured to cause the motor rotation part 412 to rotate with respect to the motor main body 411. The motor rotation part 412 may have a certain appropriate shape to fix the propeller assembly including the first structure 420.

According to various embodiments, the first structure 420 may be coupled with the motor 410 and may be configured to transmit the rotation of the motor 410 to the propeller assembly, that is, the propeller. According to an embodiment, the first structure 420 may include a cylindrical wall 421 and a bottom surface 422. The cylindrical wall 421 and the bottom surface 422 may define an inner space 423 of the first structure 420. The first structure 420 may have the bottom surface 422 attached to an upper portion of the motor ration part 412, thereby being fixed to the motor rotation part 412. The first structure 420 may be fixed to the motor 410, for example, the motor rotation part 412, such that the center of the cylindrical wall 421 is the same as the rotation center of the motor rotation part 412. Accordingly, the rotation of the motor rotation part 412 can be stably transmitted to the first structure 420. The first structure 420 may be fixed to the motor rotation part 412 by a fastening mechanism of a certain shape, welding or other means. According to an embodiment, the first structure 420 may be fixedly coupled to the motor rotation part 412 by a plurality of screws 460. The first structure 420 and the motor rotation part 412 may include first holes 424 and first fastening mechanisms 413 formed on corresponding positions, respectively, when viewed from above along the direction of the rotation axis A. The plurality of screws 460 may be screwed into the plurality of first fastening mechanisms 413, respectively. The plurality of first fastening mechanisms 413 may be positioned to have the same central angle with reference to the rotation axis A. For example, the plurality of first fastening mechanisms 413 may be positioned on the upper surface of the motor rotation part 412 to have a central angle of 120 degrees therebetween. According to another embodiment, the first structure 420 may be integrated with the motor rotation part 412, or may include a substantially unitary structure.

According to various embodiments, the first structure 420 may be assembled with the second structure 430 and the propeller (for example, 350 of FIG. 3A). The second structure 430 and the propeller may be fixed to the motor rotation part 412 by the first structure 420. Accordingly, the first structure 420 may be referred to as a bracket. According to an embodiment, a cylinder part 431 of the second structure 430 may have at least part thereof rotatably positioned in the inner space 423 of the first structure 420. The cylindrical wall 421 of the first structure 420 may include at least one helical slit 425. The helical slit 425 may be formed from an uppermost end of the cylindrical wall 421 in the opposite direction of the rotation direction r of the motor 410 (or the propeller). The second structure 430 may be inserted into an entrance of the helical slit 425 formed on the uppermost end of the cylindrical wall 421, thereby being engaged with the first structure 420. The helical slit 425 may guide a rotation (or a helical movement) of the engaged second structure 430. The helical slit 425 is formed in the opposite direction of the rotation direction r, such that the second structure 430 can be prevented from being released from the helical slit 425 due to a rotation. As described in FIG. 2B, the plurality of propellers may have various rotation directions in the unmanned aerial vehicle. Accordingly, the helical slit 425 may be formed on the first structure 420 in various directions according to rotation directions of the propellers.

According to various embodiments, a relationship between the second structure 430 and the helical slit 425 will be described in detail below. According to an embodiment, the first structure 420 may include at least one guide groove 426 formed on an outer surface (side surface) of the cylindrical wall 421. The at least one guide groove 426 may be positioned along the cylindrical wall 421 to have the same central angle as each other and to correspond to a rib (for example, 353 of FIG. 3A) of the propeller (for example, 350 of FIG. 3A). The rib of the propeller may be inserted downward along the guide groove 426. Accordingly, the propeller may be engaged with the first structure 420. The guide groove 426 may confine a movement of the engaged propeller in the rotation direction r, and may transmit the rotation of the motor 420 to the propeller. According to an embodiment, the guide groove 426 may overlap the helical slit 426 at least partially. The guide groove 426 may overlap a helical movement path of a protrusion 433 of the second structure 430 at least partially, which moves along the helical slit 425.

According to various embodiments, the second structure 430 helically moves with respect to the first structure 420, thereby providing an engaging/disengaging mechanism of the propeller with/from the first structure 420. Accordingly, the second structure 430 may be referred to as a rotation ring or a brace. According to an embodiment, the second structure 430 may include the cylinder part 431, at least one arm 432 protruding from an outer surface (side surface) of the cylinder part 431 in the radial direction, and at least one protrusion 433 disposed at an end of the arm 432. A diameter of the cylinder part 431 may be substantially the same as or smaller than a diameter of the inner space 423 of the first structure 420. The cylinder part 431 may rotate in the inner space 423 with respect to the first structure 420. Specifically, the at least one arm 432 may penetrate through the helical slit 425 of the first structure 420 and slide along the helical slit 425, such that the second structure 430 helically moves with respect to the first structure 420. The helical movement of the second structure 430 may involve a rotation with respect to the first structure 420 and a vertical movement along the rotation axis A. According to an embodiment, according to the helical movement of the second structure 430, a first end 433a of the protrusion 433 may be positioned to overlap or not to overlap the guide groove 426 of the first structure 420 at least partially. For example, when one end 433a of the protrusion 433 is positioned to overlap the guide groove 426, the one end may interfere with insertion of the rib into the guide groove 426. When the second structure 430 helically moves substantially in the downward direction and thus the one end 433a of the protrusion 433 is positioned not to overlap the guide groove 426, the one end may not interfere with the insertion path. That is, the one end 433a of the protrusion 433 may open or close the insertion path of the rib of the propeller engaged with the guide groove 426. Accordingly, the propeller may be engaged and fixed, or may be disengaged by the protrusion 433. The engaging/disengaging operation of the propeller by such a mechanism will be described in detail below.

According to various embodiments, the elastic member 440 may be configured to push the cylinder part 431 of the second structure 430 in the upward direction from the motor 410. The elastic member 440 may have a certain shape and a structure appropriate to apply an elastic force to the second structure 430. For example, the elastic member 440 may include a spring. According to an embodiment, the elastic member 440 may be disposed between the bottom surface 422 of the first structure 420 and a lower surface of an inside of the second structure 430. According to an embodiment, a diameter of the elastic member 440 may be substantially the same as or smaller than an inner diameter of the inner space 423 of the first structure 420. According to an embodiment, the elastic member 440 may be disposed to substantially tightly fit in the inner space 423 of the first structure 420, thereby preventing a vibration of the elastic member 440 despite of high-speed rotation of the first structure 420 caused by the motor 410.

According to an embodiment, the fixing member 450 may include a pole 451 and a fixing cap 452. The fixing member 450 may penetrate through the second structure 430, the elastic member 440, and the first structure 420 in sequence along the rotation axis A, and may be fixed to the motor rotation part 412. For example, an end 451a of the pole 451 may be fixedly coupled to a second hole 427 formed on the center of the bottom surface 422 of the first structure 420, and a second fastening mechanism 414 formed on the center of the motor rotation part 412. The end 451a and the second fastening mechanism 414 may be fixed to each other by screwing or welding, bonding or other means. For example, the end 451a may be screwed into the second hole 427 and the second fastening mechanism 414, thereby fixing the first structure 420 and the motor rotation part 412. In an additional embodiment, screw threads may be formed on the second hole 427 and may be screwed with the end 451a.

According to various embodiments, the fixing member 450 may be configured to restrict a range of the vertical movement of the second structure 430 with respect to the first structure 420 in the direction of the rotation axis A. According to an embodiment, the fixing cap 452 of the fixing member 450 may have a diameter larger than that of the pole 451 and that of a penetrating hole 431b of the second structure 430 through which the pole 451 penetrates. The fixing cap 452 may be received in a recessed cutout 431a which is defined as an upper portion of a border of the penetrating hole 431b of the second structure 430. A stepped portion between the recessed cutout 431a and the penetrating hole 431b is blocked by the fixing cap 452, such that the upward movement of the second structure 430 along the rotation axis A can be restricted. That is, the second structure 430 may vertically move (or helically move) in the inner space 423 of the first structure 420 within a range of a length of the pole 451.

Figure 5:
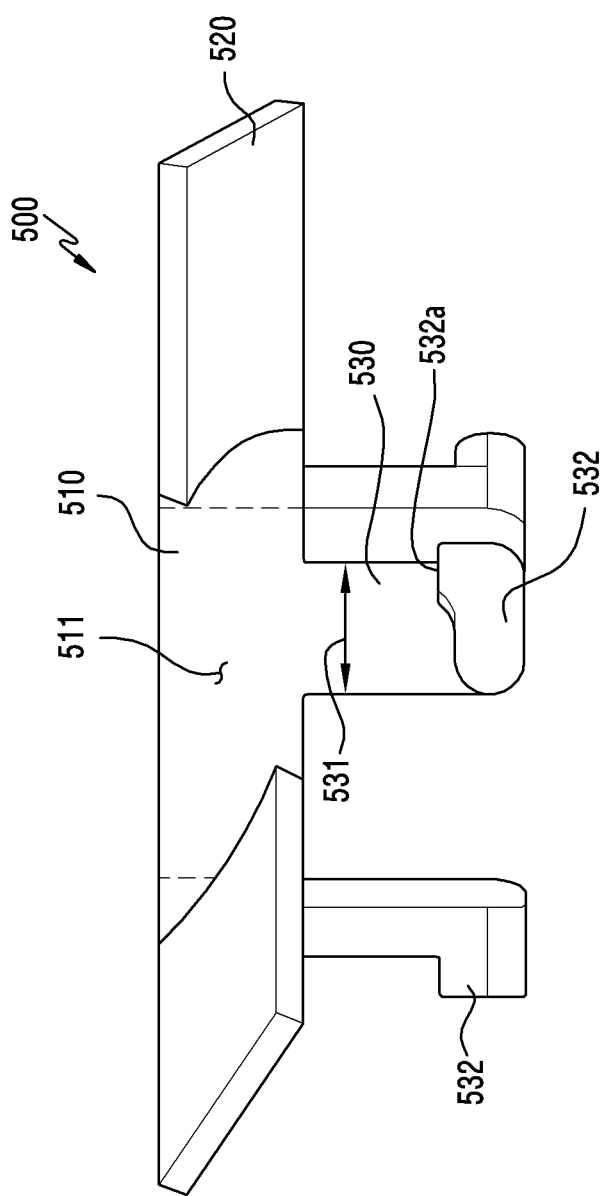
FIG. 5 is a side view of a propeller according to various embodiments of the disclosure.

FIG. 5 is a side view of a propeller according to various embodiments of the disclosure. The propeller 500 of FIG. 5 may be similar to the propeller 350 of FIG. 3A at least partially, or may be include other embodiments of the propeller.

Referring to FIG. 5, the propeller 500 according to an embodiment may include a cylindrical hub 510. A cavity 511 of the cylindrical hub 510 may have a diameter larger than a diameter of a cylinder part (for example, 431 of FIG. 4A) to receive at least part of a second structure (for example, 430 of FIG. 4A). The propeller 500 according to an embodiment may include a plurality of rotor blades 520 extended from a circumferential surface (side surface) of the cylindrical hub 510. The plurality of rotor blades 520 may be positioned to have the same central angle as each other along the circumferential surface (side surface) of the cylindrical hub 510. Although three rotor blades are illustrated with some parts thereof being omitted in the drawing, the propeller 500 according to various embodiments may include at least two rotor blades having various shapes.

According to an embodiment, the propeller 500 may include a plurality of ribs 530 extended downward from the cylindrical hub 510. The plurality of ribs 530 may be positioned to have the same central angle along the circumference of the cylindrical hub 510. The rib 530 may have a predetermined length to be inserted into a guide groove (for example, 426 of FIG. 4A) of a first structure in the downward direction along the rotation axis. Alternatively, the rib 530 may have a width 531 which is substantially the same as a width (for example, 426a of FIG. 4A) of the guide groove 426. Accordingly, the rib 530 may be inserted to substantially tightly fit in the guide groove 426, and may confine a movement of the propeller 500 in the rotation direction with respect to the first structure. The rib 530 according to an embodiment may include a latch 532 protruding therefrom at least partially in the radial direction of the cylindrical hub 510. A stepped portion between the latch 532 and the rib 530 is blocked by a protrusion (for example, 433 of FIG. 4A) of the second structure, such that an upward movement of the propeller 500 along the rotation axis A can be confined. That is, the plurality of ribs 530 of the propeller 500 may be engaged with and fixed to the first structure by the guide groove of the first structure and the protrusion of the second structure.

Figure 6A:
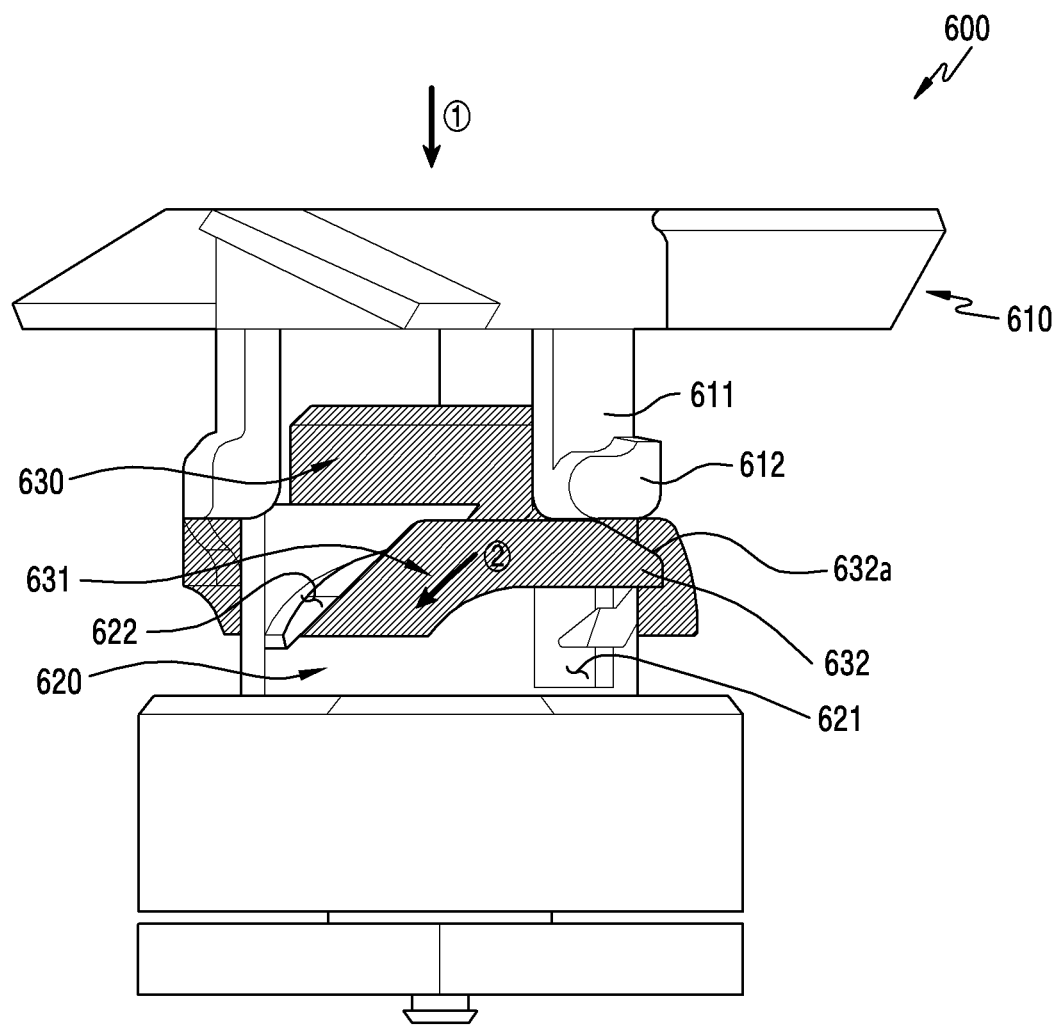
FIGS. 6A to 6C are operation views illustrating a process of causing a propeller to engage with a propeller assembly according to various embodiments of the disclosure.
Figure 6B:
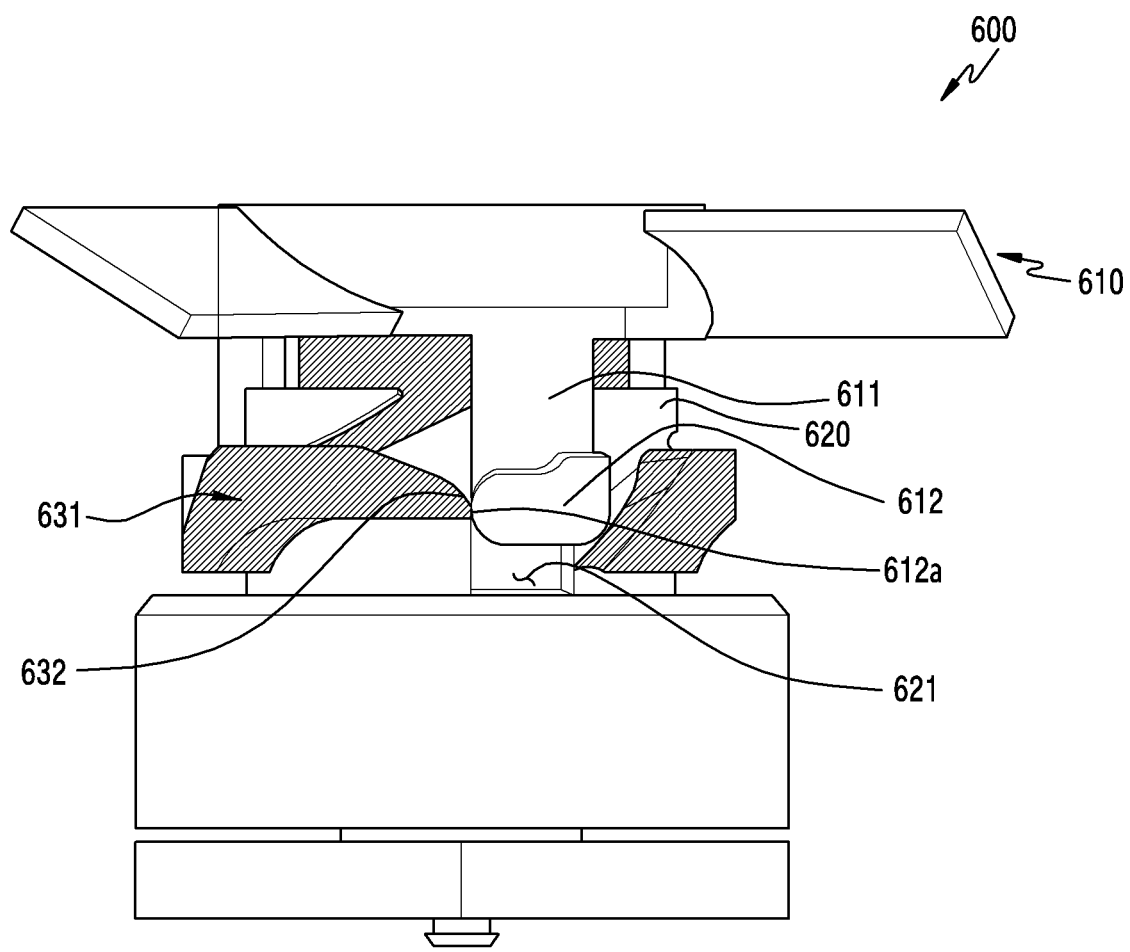
Figure 6C:
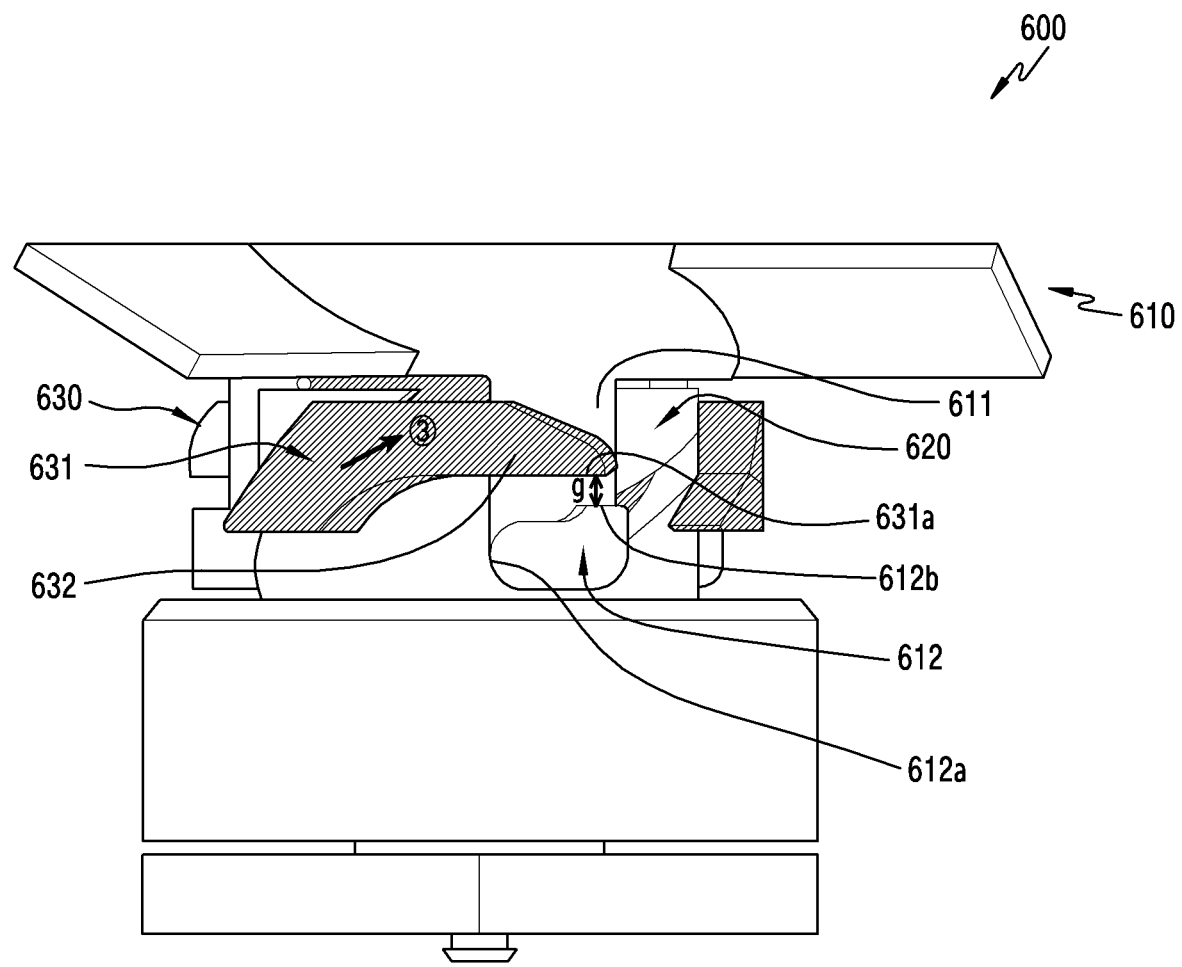

FIGS. 6A to 6C are operation views illustrating a process of causing a propeller to engage with a propeller assembly according to various embodiments of the disclosure. A propulsion system 600 disclosed in FIGS. 6A to 6C may be similar to the propulsion system 300 disclosed in FIG. 3A at least partially, or may include other embodiments of the propulsion system.

Referring to FIG. 6A, the propeller 610 according to various embodiments of the disclosure may move down (in a direction of ①) to cause at least one rib 611 of the propeller 610 to be inserted into a guide groove 621 of a first structure 620, and may be engaged with the first structure 620. In an embodiment, a second structure 630 may be maintained at the highest position (or in a default state) in the upward direction by an elastic member (for example, 440 of FIG. 4A) disposed in an inner space (for example, 423 of FIG. 4A) of the first structure 620. In the default state of the second structure 630, a protrusion 631 of the second structure 630 may be positioned to overlap at least part of an upper end of the guide groove 621 of the first structure 620. In other words, the protrusion 631 of the second structure 630 may prevent the rib 611 from being inserted into the guide groove 621. The rib 611 may be inserted along the guide groove 621, and a latch 612 formed at an end of the rib 611 may push down the protrusion 631. As the protrusion 631 is pushed down, the protrusion 631 (or the second structure 630) may helically move in a direction of ② along a helical slit 622 against an elastic force of the elastic member.

According to an embodiment, a first end 632 of the protrusion 631 toward the guide groove 621 may include a chamfer 632a formed on an upper portion thereof with which the latch 612 comes into contact. The first end 632 has the chamfer 632a, such that the protrusion 631 can smoothly slide along the helical slit 622 by being pushed by the latch 612. An angle between the chamfer 632a and an insertion path of the rib 611, and an angle of the helical slit 622 may be adjusted according to a size of each component of the propulsion system 600, and preferably, may be determined to be between 5 degrees and 85 degrees.

Referring to FIG. 6B, the protrusion 631 helically moves by being pushed by the latch 612, such that the propeller 610 is smoothly engaged with the guide groove 621 without interference of the protrusion 631. According to an embodiment, the protrusion 631 may helically move and move down to a lower end of the second structure 620, and may be positioned not to overlap the guide groove 621, thereby allowing the rib 611 and the latch 612 to be inserted into the guide groove 621. According to an embodiment, a first corner 612a to come into contact with the first end 632 of the protrusion 631 may be rounded. The rounded first corner 612a may smoothen a movement according to an interaction between the protrusion 631 and the latch 612 when the rib 611 is inserted into the guide groove 621.

FIG. 6C illustrates that the propeller 610 according to various embodiments of the disclosure is completely engaged with the first structure 620. Referring to FIG. 6C, when the propeller 610 is engaged with the first structure 620 (or the rib 611 is engaged with (is inserted into) the guide groove 621), the protrusion 613 which helically moves by being pushed by the latch 612 may be restored to the default state due to a repulsive force of the elastic member (not shown). In this process, the protrusion 631 may helically move along the helical slit 622 (FIG. 6A) in a direction of ③. The helical movement may be smoothened by the interaction between the first end 632 of the protrusion 631 and the rounded first corner 612a of the latch 612 which is completely engaged with the first structure 620.

According to various embodiments, the protrusion 631 which is restored to the default state may be configured to restrict a range of a vertical movement of the propeller 610 in the direction of the rotation axis A. According to an embodiment, when the propeller 610 is engaged with the first structure 620, the first end 632 of the protrusion 631 may be positioned on an upper end of the latch 612 of the rib 611. The stepped portion between the latch 612 and the rib 611 is blocked by the protrusion 631, such that an upward movement of the rib 611 in the guide groove 621 can be confined. Accordingly, the upward movement of the propeller 610 is confined by the protrusion 631 of the second structure 630 which is restored to the default state, and a rotation with respect to the first structure 620 is confined by the guide groove 621 (FIG. 6A) of the first structure 620, such that the propeller 610 can be fixed to the first structure 620. That is, the unmanned aerial vehicle and the propulsion system according to various embodiments of the disclosure can cause the propeller to be easily engaged only by a single operation of a user simply pushing the propeller, and simultaneously, the propeller which is not easily separated by an external shock is provided.

In an additional embodiment, a portion of the upper surface of the latch 612 may be formed with a flat portion 612b having a predetermined height. The flat portion 612b may be configured to bring the latch 612 and a lower surface 631a of the protrusion 631 into contact with each other with a reduced gap g between the latch 612 and the lower surface 631a or without the gap g in the state in which the propeller 610 is engaged. Accordingly, when the engaged propeller 610 rotates, a vibration of the propeller 610 which may be caused the gap g can be reduced.

FIGS. 7A to 7D are operation views illustrating a process of separating a propeller from a propeller assembly according to various embodiments of the disclosure. A propulsion system 700 disclosed in FIGS. 7A to 7D may be similar to the propulsion system 600 disclosed in FIGS. 6A to 6C at least partially, or may include other embodiments of the propulsion system.

Figure 7A:
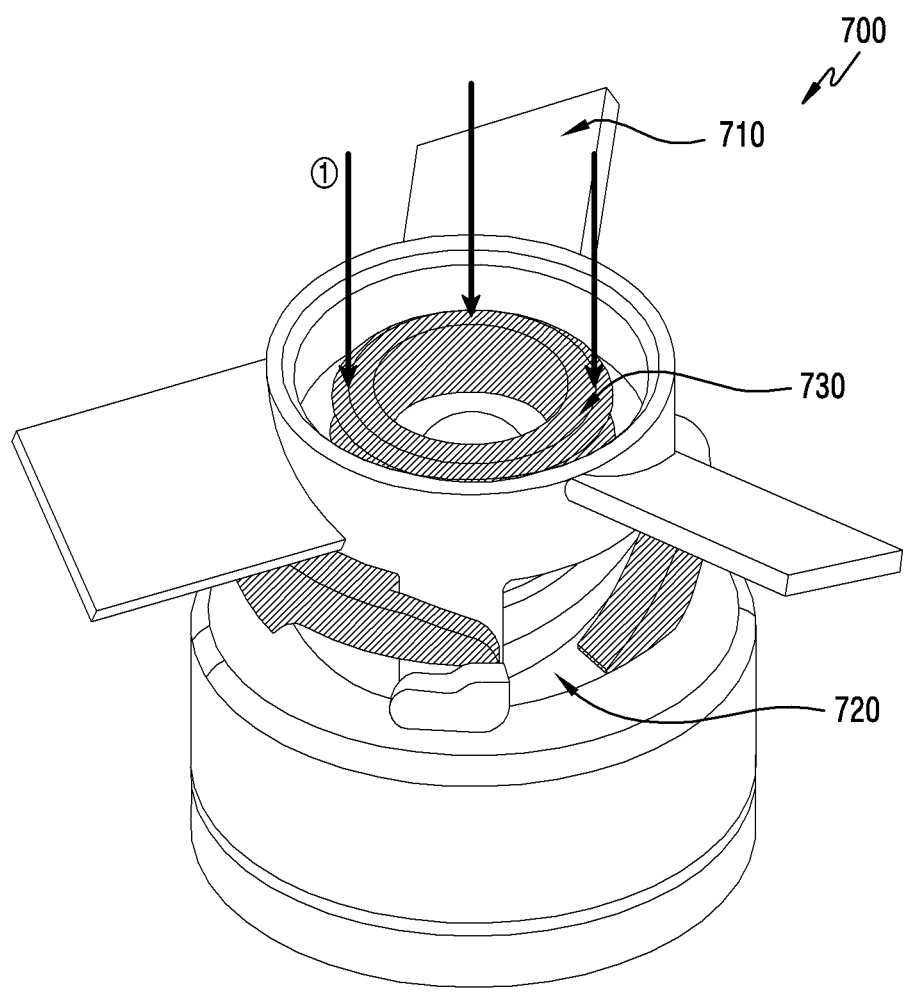
FIGS. 7A to 7D are operation views illustrating a process of separating a propeller from a propeller assembly according to various embodiments of the disclosure.

Referring to FIG. 7A, the propeller 710 according to various embodiments of the disclosure may be helically moved by a user pushing down a second structure 730 (in a direction of ①), and may be separated from a first structure 720. That is, the user may separate the propeller 710 from the propulsion system 700 without performing a direction operation on the engaged propeller 710.

Figure 7B:
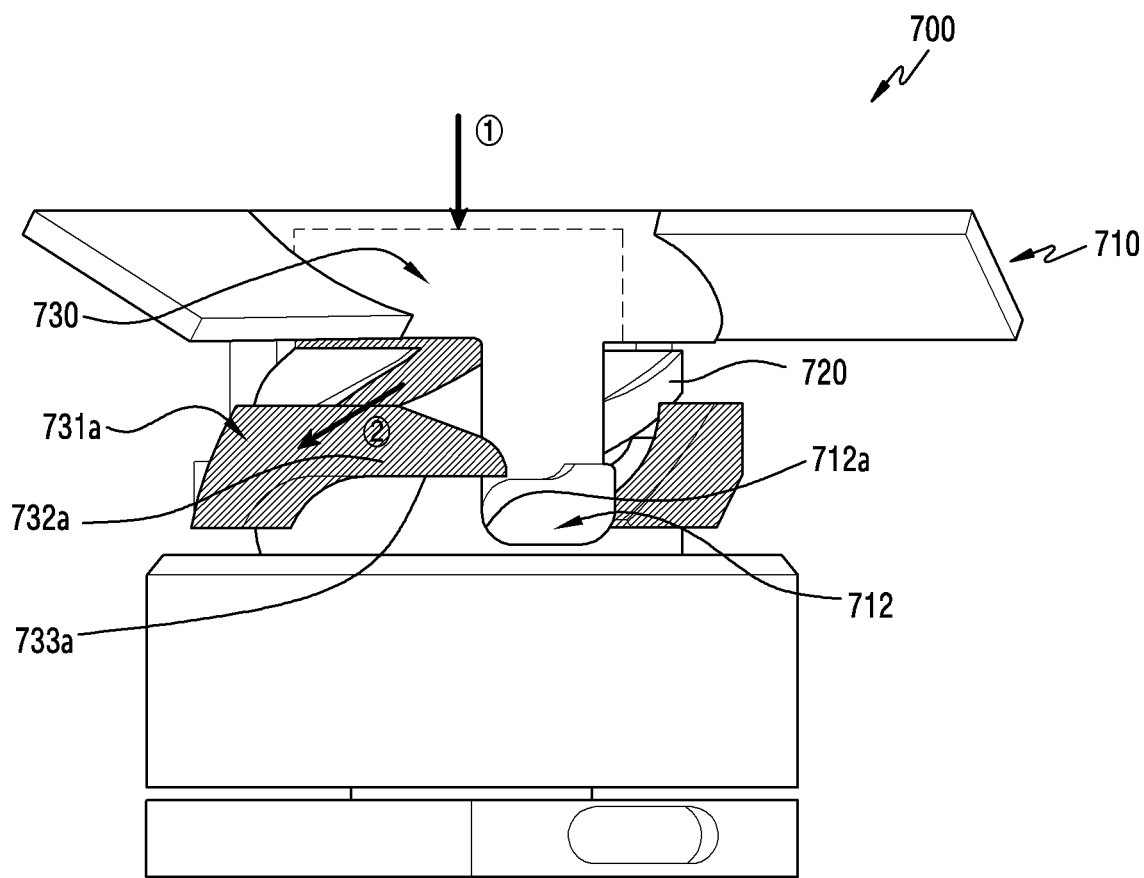

FIG. 7B illustrates the operation of the user pushing down the second structure 730 (in the direction of ①). Accordingly, a first protrusion 731a helically moves in a direction of ② with respect to a first structure 720, and a lower surface 733a of a first end 732a may slide on a rounded first corner 712a of a latch 712 of the engaged propeller 710, and the first protrusion 731a may move down to a lower end of the first structure 720.

Figure 7C:
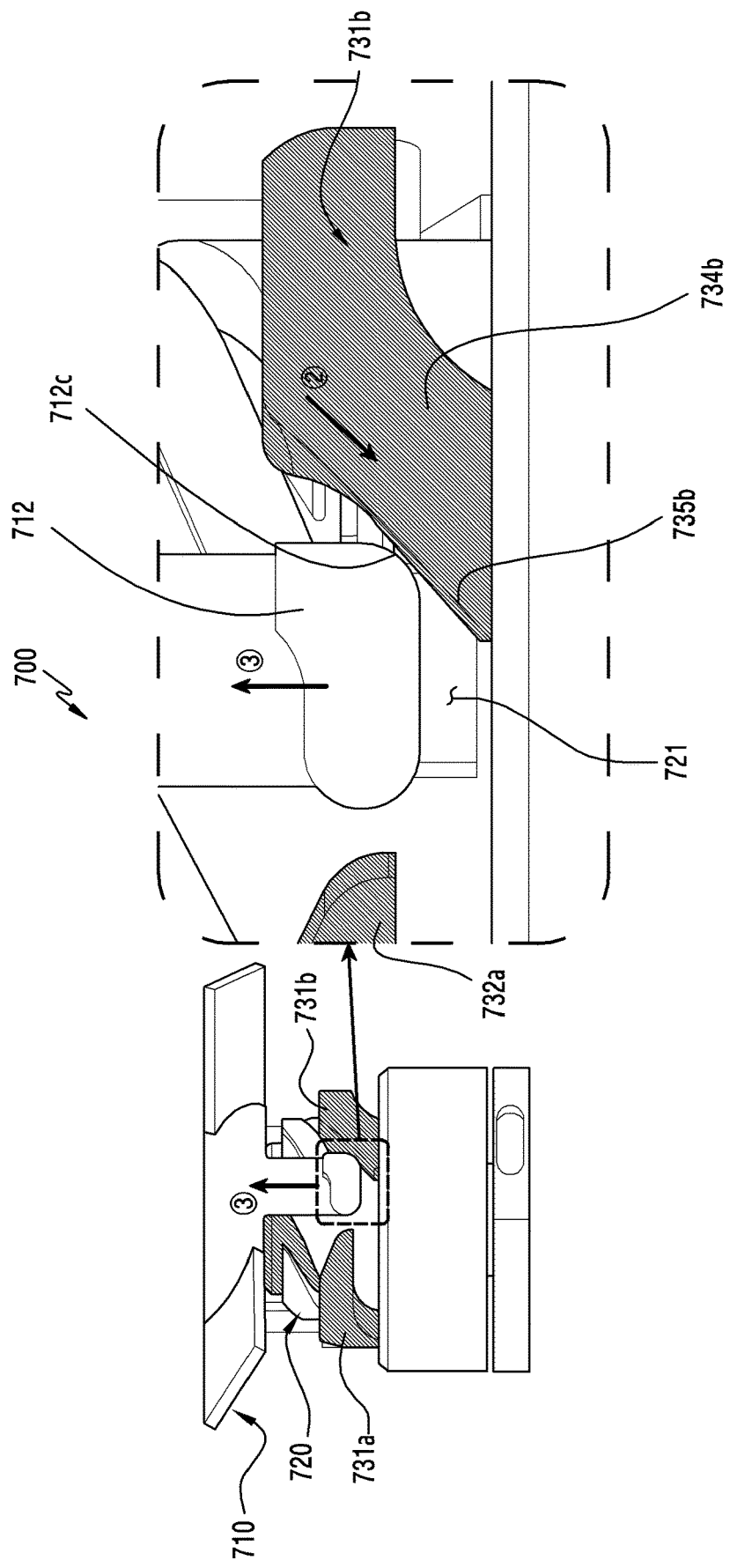

Referring to FIG. 7C, the propeller 710 may move up (in a direction of separating) with respect to the first structure 720 by a second protrusion 731b. According to an embodiment, when the first protrusion 731a moves down to a lowermost end of the first structure 720, the second protrusion 731b neighboring the first protrusion 731a and included in the second structure 730 may move down to a lowermost end of the first structure 720 along with the first protrusion 731a. When the first protrusion 731a and the second protrusion 731b of the second structure 730 move down to the lowermost end of the first structure 720, a first end 732a of the first protrusion 731a may be positioned not to interfere with the path of the guide groove 721, whereas a second end 734b of the second protrusion 731b may be positioned to interfere with the insertion path of the guide groove 721. For example, each protrusion may include a first end that interferes with the path of the guide groove 721 in the default state of the second structure 730, and a second end positioned opposite to the first end. According to an embodiment, each protrusion may include the first end and the second end which is opposite to the first end in the circumferential direction. The first end may be positioned to overlap an upper end of the guide groove 621 at least partially when the second structure 630 is positioned at the highest position with respect to the first structure 620. The second end may be positioned to overlap a lower end of another guide groove neighboring the guide groove 621 at least partially when the second structure 630 is positioned at the lowest position with respect to the first structure 620. Specifically, the second end 734b of the second protrusion 731b may helically move and may come into contact with the latch 712. The second end 734b may include a chamfer 735b formed on an upper surface thereof, and the chamfer 735b may interact with a rounded second corner 712c of the latch 712, thereby smoothly moving up the latch 712 (in a direction of ③).

Figure 7D:
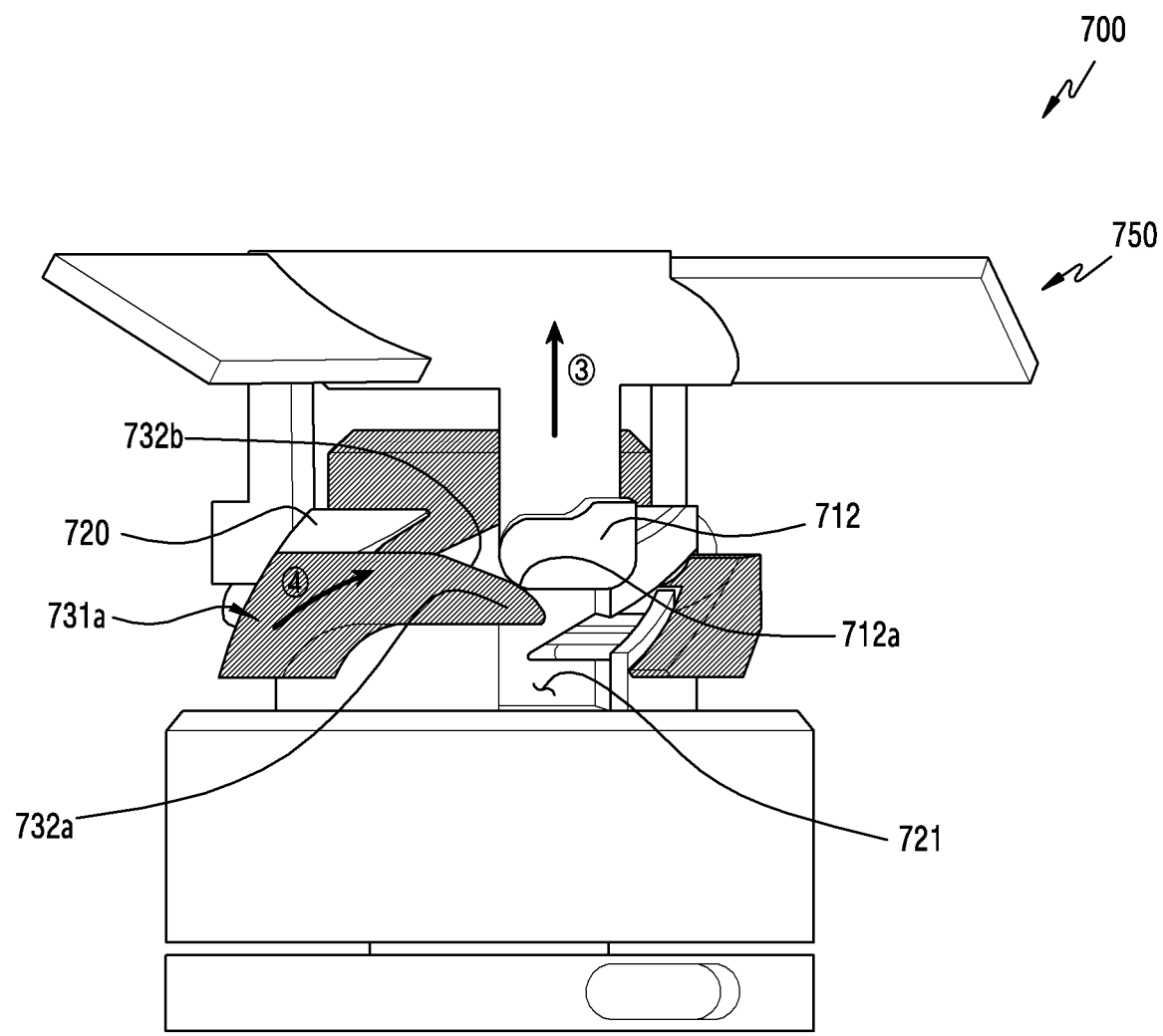

Referring to FIG. 7D, when the user releases pressing against the second structure 730, the second structure 730 may be restored to the default state by the repulsive force of the elastic member (not shown). Accordingly, the first protrusion 731a (and the second structure 730) may helically move in a direction of ④ with respect to the first structure 720. The helical movement of the first protrusion 731a may cause a chamfer 732b of the first end 732a of the first protrusion 731a to come into contact with the first corner 712a of the latch 712. As the second structure 730 helically moves in the direction of ④ and is restored to the default state, the first end 732a of the first protrusion 731a may push up the latch 712 (in the direction of ③). The latch 712 may smoothly move up by the chamfer 732b.

When the latch 712 pushed up is completely separated from the guide groove 721, the propeller 710 may also be completely separated from the propulsion system 700. Since the second structure 730 is automatically restored to the default state by the elastic member, the user can separate the propeller 710 from the propulsion system 700 simply by pressing the second structure 730. In addition, since the second structure 730 serves as a component allowing the propeller 710 to be separated, the propeller 710 may not be separated from the propulsion system 700 even when a direct force is applied to the propeller 710. The unmanned aerial vehicle and the propulsion system according to various embodiments of the disclosure can easily separate the propeller only by a single operation of a user simply pressing a specific component, and simultaneously, the propeller which is not easily separated by an external shock is provided.

Figure 8:
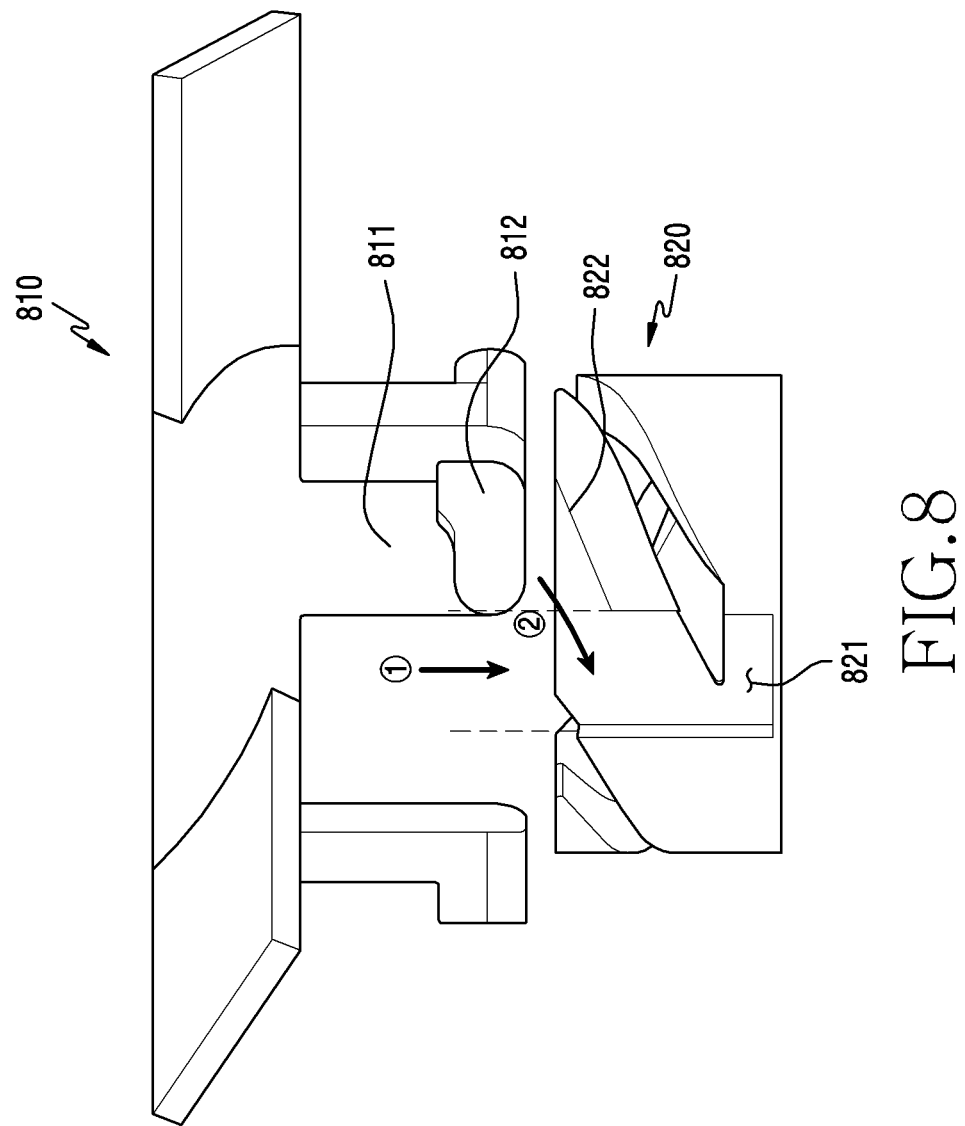
FIG. 8 is a side view of a first structure according to various embodiments of the disclosure.

FIG. 8 is a side view of a first structure according to various embodiments of the disclosure. A propeller 810 and the first structure 820 disclosed in FIG. 8 may be similar to the propeller 350 and the first structure 330 disclosed in FIG. 3A, respectively, at least partially, or may include other embodiments.

Referring to FIG. 8, the first structure 820 according to various embodiments of the disclosure may further include a guide chamfer 822 to guide an engagement of the propeller 810. According to an embodiment, a rib 811 and a latch 812 of the propeller 810 are inserted into a guide groove 821 of the first structure 820, such that the propeller 810 is engaged with the first structure 820. The guide chamfer 822 may be inclined toward the guide groove 821, thereby guiding the rib 811 of the propeller 810 to be exactly inserted into the guide groove 821. For example, when the user does not place the propeller 810 to have the rib 811 of the propeller 810 exactly inserted into the guide groove 821, and pushes the propeller 810 with the rib 811 being in contact with the guide chamfer 822, a lower surface of the latch 812 may slide on the guide chamfer 822 (in a direction of ②) and the rib 811 may be inserted into the guide groove 821. That is, the user can easily engage the propeller 810 with the first structure 820 without exactly inserting the rib 811 into the guide groove 821.

Figure 9:
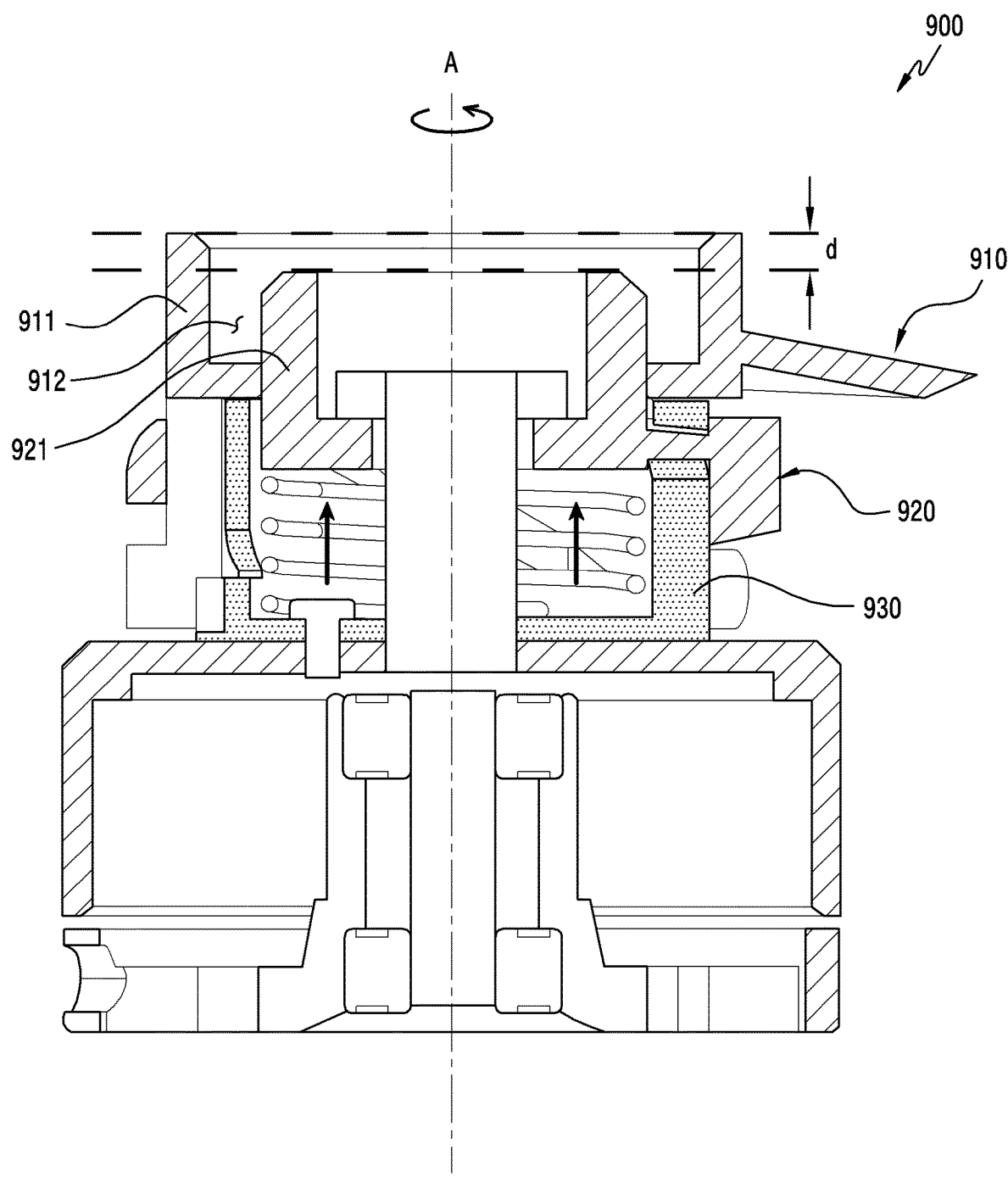
FIG. 9 is a cross-sectional view of a propulsion system according to various embodiments of the disclosure.

FIG. 9 is a cross-sectional view of a propulsion system according to various embodiments of the disclosure. The propulsion system 900 disclosed in FIG. 9 may be similar to the propulsion system 300 disclosed in FIG. 3A at least partially, or may include other embodiments. Since a propeller 910 is configured to be fixed or separated by a second structure 920 in the propulsion system 900 according to various embodiments of the present disclosure as described above, an external shock to the second structure 920 may cause unintended separation of the propeller 910.

Referring to FIG. 9, in a state in which the propeller 910 is engaged and the second structure 920 is in the default state (is at the highest position with respect to a first structure 930), the propulsion system 900 according to various embodiments may be configured such that a cylinder part 921 of the second structure 920 does not protrude to the outside further than a cylindrical hub 911 of the propeller 910. For example, the second structure 920 may be received and disposed in a recessed cutout 912 of the cylindrical hub 911 of the propeller 910. An uppermost end of the cylindrical hub 911 and an uppermost end of the cylinder part 921 of the second structure 920 may have a predetermined gap d therebetween. Accordingly, in the propulsion system 900 according to an embodiment of the disclosure, a direct external shock can be prevented from being applied to the second structure 920, and unintended separation of the propeller 910 may not occur.

According to various embodiments of the disclosure, an unmanned aerial vehicle may include: a housing; a wireless communication circuitry positioned at least partially within or coupled to the housing, and configured to establish a wireless communication with an external controller; a plurality of propulsion systems embedded at least partially within or coupled to the housing; and a navigation circuitry configured to control the plurality of propulsion systems, wherein at least one of the plurality of propulsion systems includes: a motor controlled by the navigation circuitry; and a propeller assembly coupled to the motor, wherein the propeller assembly includes: a first structure including a cylindrical wall secured onto the motor to define an inner space, and a helical slit formed by penetrating through the cylindrical wall; a second structure including a cylinder part rotatably positioned at least partially in the inner space, and at least one protrusion protruding from an outer surface of the cylinder part to an outside of the cylindrical wall through the helical slit; and a propeller, wherein the propeller includes: a cylindrical hub engaging with the cylinder part of the second structure; a plurality of rotor blades extended from the cylindrical hub; and at least one rib extended from the cylindrical hub towards the motor, wherein at least part of the rib detachably engages with the first structure via the at least one protrusion of the second structure.

According to an embodiment, the first structure may include a guide groove formed on an outside of the cylindrical wall and configured to allow the rib of the propeller to engage therewith.

According to an embodiment, the guide groove may at least partially overlap a helical movement path of the protrusion sliding along the helical slit.

According to an embodiment, the protrusion may slide along the helical slit, and the cylinder part of the second structure may be configured to involve a rotation and an upward movement with respect to the first structure.

According to an embodiment, the unmanned aerial vehicle may further include an elastic member disposed within the inner space and configured to push up the cylinder part from the motor.

According to an embodiment, the unmanned aerial vehicle may further include a fixing member configured to restrict a range of a vertical movement of the second structure with respect to the first structure.

According to an embodiment, the protrusion may be positioned to overlap an upper end of the guide groove at least partially when the cylinder part is at a highest position with respect to the first structure.

According to an embodiment, the rib may further include a latch protruding from an end thereof in a radial direction of the cylindrical hub.

When the rib engages with the guide groove, the latch may be positioned to overlap a lower end of the guide groove at least partially.

According to an embodiment, the latch may further include a flat portion formed on at least part of an upper portion of the latch and having a predetermined height.

According to an embodiment, the protrusion may include a first end and a second end which is opposite to the first end along a circumferential direction of the cylinder part.

The first end may be positioned to overlap an upper end of the guide groove at least partially when the cylinder part is at a highest position with respect to the first structure.

The second end may be positioned to overlap a lower end of another guide groove neighboring the guide groove at least partially when the cylinder part is at a lowest position with respect to the first structure.

According to an embodiment, the protrusion may include a chamfer formed on an upper portion thereof and facing downward.

According to an embodiment, each of the first end and the second end may include a chamfer formed on an upper portion thereof and facing downward.

According to an embodiment, the first structure may further include a guide chamfer formed on an outside of the cylindrical wall and inclined toward the guide groove.

According to an embodiment, when the propeller engages with the first structure and the cylinder part is at a highest position with respect to the first structure, a height of the cylindrical hub may be higher than the cylinder part of the second structure.

According to various embodiments, a propulsion system may include: a motor including a motor main body and a motor rotation part; a first structure including a cylindrical wall secured onto the motor to define an inner space, and including at least one helical slit formed by penetrating through the cylindrical wall, and at least one guide groove configured to allow a propeller to detachably engage therewith; a second structure including a cylinder part rotatably positioned at least partially in the inner space, and at least one protrusion protruding from an outer surface of the cylinder part to an outside of the cylindrical wall through the at least one helical slit; and an elastic member disposed within the inner space and configured to push up the cylinder part from the motor rotation part.

According to an embodiment, the propulsion system may further include a propeller which includes: a cylindrical hub engaging with the cylinder part of the second structure; a plurality of rotor blades extended from the cylindrical hub; and a rib configured to be inserted into the guide groove from the cylindrical hub, and the protrusion may be configured to helically slide along the helical slit to interfere with a movement of the rib and to prevent the rib from being separated from the guide groove when the rib is engaged with the guide groove.

According to an embodiment, the rib may further include a latch protruding from an end thereof in a radial direction of the cylindrical hub, and the latch may be blocked by the protrusion, such that the rib is not separated from the guide groove.

According to an embodiment, the guide groove may overlap a helical movement path of the protrusion with respect to the first structure at least partially.

According to an embodiment, the helical movement of the protrusion may involve a rotation and a vertical movement of the cylinder part with respect to the first structure.

According to an embodiment, the propulsion system may further include a fixing member fixedly coupled with the motor rotation part by penetrating through the cylinder part and the elastic member, and configured to restrict a range of a vertical movement of the second structure with respect to the first structure.

The term "module" as used herein may include a unit consisting of hardware, or hardware with memory storing executable instructions, and may, for example, be used interchangeably with the term "logic", "logical block", "component", "circuit", or the like. The "module" may be an integrated component, or a minimum unit for performing one or more functions or a part thereof. The "module" may be mechanically or electronically implemented and may include, for example, an Application-Specific Integrated Circuit (ASIC) chip, a Field-Programmable Gate Arrays (FPGA), or a programmable-logic device, which has been known or are to be developed in the future, for performing certain operations. At least some of devices (e.g., modules or functions thereof) or methods (e.g., operations) according to various embodiments may be implemented by an instruction which are stored a computer-readable storage medium (e.g., the memory) in the form of a program module. When the instruction is executed by a processor (e.g., control unit (310)), the processor may perform a function corresponding to the instruction. The computer-readable storage medium may include a hard disk, a floppy disk, a magnetic medium (e.g., a magnetic tape), an optical media (e.g., compact disc read-only memory CD-ROM, DVD), a magneto-optical media (e.g., a floptical disk), an inner memory, etc. The instruction may include a code which is made by a compiler or a code which may be executed by an interpreter. The programming module according to the present disclosure may include one or more of the aforementioned components or may further include other additional components, or some of the aforementioned components may be omitted. Operations performed by a module, a programming module, or other elements according to various embodiments may be executed sequentially, in parallel, repeatedly, or in a heuristic manner. At least some operations may be executed according to another sequence, may be omitted, or may further include other operations.

Various embodiments of the present invention disclosed in the specification and drawings are only specific examples to easily explain the technical contents of the present invention and aid the understanding of the present invention, and are not intended to limit the scope of the present invention. Therefore, the scope of the present invention should be construed that all changes or modifications derived based on the technical spirit of the present invention are included in the scope of the present invention in addition to the embodiments disclosed herein.

What is claimed is:

1. An unmanned aerial vehicle comprising:
    a housing;
    a wireless communication circuitry positioned at least partially within or coupled to the housing, and configured to establish a wireless communication with an external controller;
    a plurality of propulsion systems embedded at least partially within or coupled to the housing; and
    a navigation circuitry configured to control the plurality of propulsion systems,
    wherein at least one of the plurality of propulsion systems comprises:
    a motor controlled by the navigation circuitry; and
    a propeller assembly coupled to the motor,
    wherein the propeller assembly comprises:
    a first structure comprising a cylindrical wall secured onto the motor to define an inner space, and a helical slit formed by penetrating through the cylindrical wall;
    a second structure comprising a cylinder part rotatably positioned at least partially in the inner space, and at least one protrusion protruding from an outer surface of the cylinder part to an outside of the cylindrical wall through the helical slit; and
    a propeller,
    wherein the propeller comprises:
    a cylindrical hub engaging with the cylinder part of the second structure;
    a plurality of rotor blades extended from the cylindrical hub; and
    at least one rib extended from the cylindrical hub towards the motor,
    wherein at least part of the rib detachably engages with the first structure via the at least one protrusion of the second structure.

2. The unmanned aerial vehicle of claim 1, wherein the first structure comprises a guide groove formed on an outside of the cylindrical wall and configured to allow the rib of the propeller to engage therewith.

3. The unmanned aerial vehicle of claim 2, wherein the guide groove at least partially overlaps a helical movement path of the protrusion sliding along the helical slit.

4. The unmanned aerial vehicle of claim 3, wherein the protrusion slides along the helical slit, and the cylinder part of the second structure is configured to involve a rotation and an upward movement with respect to the first structure.

5. The unmanned aerial vehicle of claim 4, further comprising an elastic member disposed within the inner space and configured to push up the cylinder part from the motor.

6. The unmanned aerial vehicle of claim 4, further comprising a fixing member configured to restrict a range of a vertical movement of the second structure with respect to the first structure.

7. The unmanned aerial vehicle of claim 6, wherein the protrusion is positioned to overlap an upper end of the guide groove at least partially when the cylinder part is at a highest position with respect to the first structure.

8. The unmanned aerial vehicle of claim 7, wherein the rib further comprises a latch protruding from an end thereof in a radial direction of the cylindrical hub, and wherein, when the rib engages with the guide groove, the latch is positioned to overlap a lower end of the guide groove at least partially.

9. The unmanned aerial vehicle of claim 8, wherein the latch further comprises a flat portion formed on at least part of an upper portion of the latch and having a predetermined height.

10. The unmanned aerial vehicle of claim 7, wherein the protrusion comprises a chamfer formed on an upper portion thereof and facing downward.

11. The unmanned aerial vehicle of claim 6, wherein the protrusion comprises a first end and a second end which is opposite to the first end along a circumferential direction of the cylinder part,
wherein the first end is positioned to overlap an upper end of the guide groove at least partially when the cylinder part is at a highest position with respect to the first structure,
wherein the second end is positioned to overlap a lower end of another guide groove neighboring the guide groove at least partially when the cylinder part is at a lowest position with respect to the first structure.

12. The unmanned aerial vehicle of claim 11, wherein each of the first end and the second end comprises a chamfer formed on an upper portion thereof and facing downward.

13. The unmanned aerial vehicle of claim 6, wherein, when the propeller engages with the first structure and the cylinder part is at a highest position with respect to the first structure, a height of the cylindrical hub is higher than the cylinder part of the second structure.

14. The unmanned aerial vehicle of claim 2, wherein the first structure further comprises a guide chamfer formed on an outside of the cylindrical wall and inclined toward the guide groove.

15. A propulsion system comprising:
a motor comprising a motor main body and a motor rotation part;
a first structure comprising a cylindrical wall secured onto the motor to define an inner space, and comprising at least one helical slit formed by penetrating through the cylindrical wall, and at least one guide groove configured to allow a propeller to detachably engage therewith;
a second structure comprising a cylinder part rotatably positioned at least partially in the inner space, and at least one protrusion protruding from an outer surface of the cylinder part to an outside of the cylindrical wall through the at least one helical slit; and
an elastic member disposed within the inner space and configured to push up the cylinder part from the motor rotation part.

16. The propulsion system of claim 15, further comprising a propeller which includes:
a cylindrical hub engaging with the cylinder part of the second structure;
a plurality of rotor blades extended from the cylindrical hub; and
a rib configured to be inserted into the guide groove from the cylindrical hub,
wherein the protrusion helically slides along the helical slit to interfere with a movement of the rib and prevents the rib from being separated from the guide groove when the rib is engaged with the guide groove.

17. The propulsion system of claim 16, wherein the rib further includes a latch protruding from an end thereof in a radial direction of the cylindrical hub, and the latch is blocked by the protrusion such that the rib is not separated from the guide groove.

18. The propulsion system of claim 16, wherein the guide groove overlaps a helical movement path of the protrusion with respect to the first structure at least partially.

19. The propulsion system of claim 16, wherein the helical movement of the protrusion involves a rotation and a vertical movement of the cylinder part with respect to the first structure.

20. The propulsion system of claim 19, further comprising a fixing member which is fixedly coupled with the motor rotation part by penetrating through the cylinder part and the elastic member, and restricts a range of a vertical movement of the second structure with respect to the first structure.

* * * * *